United States Patent
Mushtaq

(10) Patent No.: US 11,985,145 B1
(45) Date of Patent: *May 14, 2024

(54) METHOD AND SYSTEM FOR DETECTING CREDENTIAL STEALING ATTACKS

(71) Applicant: SlashNext, Inc., Pleasanton, CA (US)

(72) Inventor: Atif Mushtaq, San Ramon, CA (US)

(73) Assignee: SLASHNEXT, INC., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/468,592

(22) Filed: Sep. 7, 2021

Related U.S. Application Data

(63) Continuation of application No. 16/580,530, filed on Sep. 24, 2019, now Pat. No. 11,146,576, which is a continuation-in-part of application No. 16/528,356, filed on Jul. 31, 2019, now Pat. No. 11,165,793, which is a continuation of application No. 15/616,061, filed on Jun. 7, 2017, now Pat. No. 10,404,723.

(60) Provisional application No. 62/347,514, filed on Jun. 8, 2016.

(51) Int. Cl.
*H04L 9/40* (2022.01)
*G06F 16/951* (2019.01)
*G06N 20/00* (2019.01)

(52) U.S. Cl.
CPC ...... *H04L 63/1416* (2013.01); *H04L 63/1425* (2013.01); *G06F 16/951* (2019.01); *G06N 20/00* (2019.01)

(58) Field of Classification Search
CPC . H04L 63/1416; H04L 63/1425; G06N 20/00; G06F 16/951
See application file for complete search history.

(56) References Cited

U.S. PATENT DOCUMENTS

| | | | |
|---|---|---|---|
| 8,448,245 B2 | 5/2013 | Banerjee et al. | |
| 9,043,894 B1 | 5/2015 | Dennison et al. | |
| 9,130,988 B2 | 9/2015 | Seifert et al. | |
| 9,917,852 B1 * | 3/2018 | Xu | H04L 63/1483 |
| 10,198,565 B2 | 2/2019 | Thomas et al. | |

(Continued)

OTHER PUBLICATIONS

Abunadi, et al., Feature extraction process: A phishing detection approach, Intelligent Systems Design and Applications (ISDA), Dec. 2013, 13th International Conference on, pp. 331-335.

(Continued)

*Primary Examiner* — Ayoub Alata
(74) *Attorney, Agent, or Firm* — Wilson Sonsini Goodrich & Rosati

(57) ABSTRACT

An Active Vision detection method and system for detecting credential stealing attacks using an automated machine-learning page examination engine is provided that may be used to detect both brand-based and custom credential stealing attacks. The approach employs similarity analysis in a two-stage process that may be achieved through supervised or self-learning machine learning techniques and is comparable to human analysis. The Active Vision System is capable of self-learning; every new attack detected by the system becomes part of system's long-term memory making it incrementally more accurate in future predictions using its past experience.

18 Claims, 17 Drawing Sheets

(56) References Cited

U.S. PATENT DOCUMENTS

| | | | |
|---|---|---|---|
| 10,404,723 B1 | 9/2019 | Mushtaq | |
| 11,146,576 B1 | 10/2021 | Mushtaq | |
| 11,165,793 B2 | 11/2021 | Mushtaq | |
| 2005/0216837 A1* | 9/2005 | Washburn | G06F 16/954 |
| | | | 715/708 |
| 2006/0253581 A1 | 11/2006 | Dixon et al. | |
| 2007/0192855 A1 | 8/2007 | Hulten et al. | |
| 2008/0189408 A1 | 8/2008 | Cancel et al. | |
| 2009/0077383 A1 | 3/2009 | De Monseignat et al. | |
| 2010/0186088 A1 | 7/2010 | Banerjee et al. | |
| 2014/0359760 A1 | 12/2014 | Gupta et al. | |
| 2017/0070520 A1 | 3/2017 | Sato et al. | |

OTHER PUBLICATIONS

Sarika, et al., An Anti-Phishing Framework to defend Tabnabbing Attack, International Conference on Security and Authentication, 2014, pp. 132-135.

Dakwala, et al., A Machine Learning Approach to Improve the Efficiency of Fake Websites Detection Techniques, IJCSC, Sep. 2015, 7(1):236-43.

El-Buhaisi, et al., Detection Model for Pharming Attack Based on IP-Address Check and Website Predictability, Master of Science Thesis, Islamic University of Gaza, 2013, 55 pages.

Martin, et al., A Framework for Predicting Phishing Websites Using Neural Networks, IJCSI International Journal of Computer Science Issues, Mar. 2011, 8(2):330-36.

Miyamoto, et al., A proposal of the AdaBoost-based detection of phishing sites, Proceedings of the Joint Workshop on Information Security, Internet Engineering Laboratory Graduate School of Information Science, 13 pages.

Ramya, et al., An Effective Strategy for Identifying Phishing Websites using Class-Based Approach, International Journal of Scientific & Engineering Research, Dec. 2011, 2(12):1-7.

U.S. Appl. No. 15/616,061 Notice of Allowance dated Apr. 25, 2019.

U.S. Appl. No. 15/616,061 Notice of Allowance dated Jun. 18, 2019.

U.S. Appl. No. 16/528,356 Notice of Allowance dated Jul. 22, 2021.

U.S. Appl. No. 16/580,530 Notice of Allowance dated Jul. 23, 2021.

* cited by examiner

METHOD AND SYSTEM FOR DETECTING CREDENTIAL STEALING ATTACKS

CROSS-REFERENCE

This application is a Continuation Application of Ser. No. 16/580,530, filed on Sep. 24, 2019, which is a Continuation-in-Part Application of U.S. Ser. No. 16/528,356, filed Jul. 31, 2019, which is a Continuation Application of U.S. Ser. No. 15/616,061, filed Jun. 7, 2017, now U.S. Pat. No. 10,404,723, which claims the benefit of U.S. Provisional Application No. 62/347,514, filed Jun. 8, 2016, each of which is incorporated herein by reference in its entirety.

BACKGROUND

Credential stealing is a problem that exists due to the increasing use of webpages that require a user to provide sensitive or confidential information in order to access products or services. An attacker may exploit this use of webpages in order to steal a user's credentials, including sensitive or confidential user information, by creating look-alike pages that match or look similar to an original legitimate web page associated with a brand or trustworthy entity. For example, a hacker seeking to acquire or steal a user's credentials may create a fake or impostor page that matches or is similar to a Sign-in, Sign-up, Password, or Recovery page of a known brand such as Google, Yahoo, or Microsoft. The hacker may then send an email or instant message to a user that includes a link to this fake page. When the user reads the email or message and selects the link, the fake page is displayed for the user. A user that fails to notice discrepancies in the URL or security certificate of the page may trust that the fake page is legitimate and may proceed to enter confidential information onto the fake page resulting in real time transfer of the user's sensitive information to the attackers.

The credential stealing attacks as described above are designed to exploit the vulnerability of the human brain that gives much higher weight to visual design and language written on a web page than to reliable indicators that may validate the identification of the page such as, for example, the URL or security certificate. A user opening a web page will typically focus on the visual appearance of the page and then on the language written on that page, and will often ignore the URL, Domain and Certificate information of a web page that will usually be visible at top of a browser window. The visual appearance and text on the page are vital to a user's perception and understanding of the origin and purpose of a particular web page. The downside is that this natural human tendency to rely on visual and textual similarities for identifying legitimate web pages associated with known brands may be exploited by a hacker or an attacker who creates a visual replica or fake page of the legitimate web page to gain a user's trust. That is, many users will assume the replica or fake page to be a legitimate web page due to visual and textual similarities associated with known brands and will not hesitate to enter their confidential information onto the replica or fake page.

There are two categories of credential stealing attacks considered in this application: (1) brand-based credential stealing; and (2) custom credential stealing. In the case of brand-based credential stealing, an attacker creates an exact replica (at least in terms of visual and textual content) of a brand page that requests for identical information required by the original legitimate page associated with the brand. In contrast, in the case of custom credential stealing, the fake page created by attackers is not an exact replica in terms of visual and textual content of a known brand page but uses certain elements of known brands such as brand logos, brand names and other brand elements to make victims believe that the page belongs to the trusted brand. An advantage of the custom credential stealing page is that an attacker can use multiple brand names on a single page to snatch or acquire a variety of information. Additionally, these pages may also ask for information that is usually not required by the original legitimate brand pages. For instance, a Banking Sign-in page does not typically request a user's social security or ATM PIN number, but a custom credential stealing page with a bank logo may have a web form asking for all of this information.

Accordingly, it would be desirable to provide a method and system that can automatically analyze a web page to detect both brand-based and custom credential stealing attacks in order to address this specific technical problem related to the use of replica or fake webpages to steal sensitive or confidential user information.

SUMMARY OF THE INVENTION

According to one or more embodiments, a method and system for detecting credential stealing attacks using an automated machine-learning page examination engine may be used to detect brand-based and custom credential stealing attacks.

In a first aspect, a method for analyzing a candidate web page to detect credential stealing attacks using a machine-learning page examination engine may comprise providing a candidate web page, providing brand profiles stored in a brand knowledge base, wherein each brand profile comprises brand identity information and brand features extracted from a known brand web page, and providing an automated machine-learning page examination engine that receives and processes the candidate web page. The page examination engine may independently extract candidate identity information and candidate features from the candidate web page and compares the candidate identity information to the brand identity information. If the candidate identity information matches the brand identity information from at least one of the brand profiles, the engine may determine that the candidate web page is not a credential stealing page. Conversely, if the candidate identity information does not match the brand identity information from at least one of the brand profiles, the engine may determine whether the candidate web page is a replica of a known brand page by comparing the candidate features to corresponding brand features from each of the brand profiles. If the candidate web page is determined to be a replica of at least one of the known brand web pages, the engine may determine that the candidate web page is a brand-based credential stealing page.

In another aspect, a method for analyzing a candidate web page to detect credential stealing attacks using a machine-learning page examination engine may also include providing custom credential stealing page profiles stored in a custom credential stealing page knowledge base. Each custom credential stealing page profile may include custom features extracted from a web page determined to be a custom credential stealing page. Additionally, brand logo profiles stored in a brand logo knowledge base may also be provided, wherein each brand logo profile comprises brand logo features extracted from official logos of one or more brands. Having determined that: (1) the candidate identity information does not match the brand identity information from at least one of the brand profiles; and (2) the candidate web page is not a brand-based credential stealing page, the page examination engine may compare the candidate features to corresponding custom features from each of the custom credential stealing page profiles to generate custom similarity feature sets. The engine may also compare the candidate features to corresponding brand logo features from each of the brand logo profiles to generate brand logo similarity feature sets. Finally, based on the custom similarity features sets and the brand logo similarity feature sets, the engine may determine whether the candidate web page is a custom credential stealing page.

In another aspect, a method for detecting a credential stealing attack may include providing a candidate web page and providing brand profiles stored in a brand knowledge base. Each brand profile may include brand identity information and brand features extracted from a known brand web page. The method may also include providing an automated machine-learning page examination engine that receives and processes the candidate web page. The page examination engine may independently perform various steps, including, for example: extracting candidate identity information and candidate features from the candidate web page; comparing the candidate identity information to the brand identity information; determining that the candidate web page is not a credential stealing page if the candidate identity information matches the brand identity information from at least one of the brand profiles; determining whether the candidate web page is a replica of a known brand page by comparing the candidate features to corresponding brand features from each of the brand profiles if the candidate identity information does not match the brand identity information from at least one of the brand profiles; and determining that the candidate web page is a brand-based credential stealing page if the candidate web page is determined to be a replica of at least one of the known brand web pages. The method may provide a graphical interface for displaying information regarding the candidate web page. The displayed information may include an identity of an infected machine on a network that has accessed the candidate web page if the candidate web page is determined to be a brand-based credential stealing page and a feature of the infected machine. The feature of the infected machine may be a machine location, a machine usage, a MAC ID, a type of machine, a machine operating system, and/or an identity of a machine user.

In some embodiments, determining whether the candidate web page is a replica of a known brand page may include extracting an image, written text, or source code from the candidate web page; comparing the image, written text or source code extracted from the candidate web page with an image, written text, or source code extracted from each of the brand profiles stored in the brand knowledge base; and generating a similarity feature set based on the comparison of the image, written text or source code extracted from the candidate web page and the image, written text, or source code extracted from each of the brand profiles stored in the brand knowledge base. In addition, the method may include updating the brand knowledge base by updating each brand profile in the brand knowledge base. In other examples, candidate features and corresponding brand features may be visual similarity features, natural language similarity features, and/or source code similarity features.

The method may also include generating a similarity feature set for the candidate features and corresponding brand features and analyzing the similarity feature set to determine whether the candidate web page is a brand-based credential stealing page. An image file of a candidate web page may be compared to an image file of each of the brand profiles in the brand knowledge base. The comparison of the image file of a candidate web page to the image file of each of the brand profiles in the brand knowledge base may generate a visual similarity feature, for example, the total graphical interest points available in a candidate web page, total graphical interest points available in a brand web page, graphical interest points matched between a candidate web page and a brand web page, image size of a candidate web page, and image size of a brand web page.

In some examples, natural language similarity features may be extracted by analyzing text written on the candidate web page and text written on the brand web page. The analysis of text written on the candidate web page and text written on the brand web page may be based on one or more factors including, for example, natural language used on the candidate web page, natural language used on the brand web page, percentage of text matched between the candidate web page and the brand web page, number of user inputs required by the candidate web page, number of user inputs required by the brand web page, number of readable paragraphs in the candidate web page, and number of readable paragraphs in the brand web page.

In other embodiments, source code similarity features may be analyzed based on, for example, the percentage of html source code matched between the candidate web page and the brand web page, the percentage of style-sheet code matched between the candidate web page and the brand web page, the number of fonts and size matched between the candidate web page and the brand web page, the number of external hyperlinks matched between the candidate web page and the brand web page, and the number of internal hyperlinks matched between the candidate web page and the brand web page.

In some embodiments, custom credential stealing page profiles stored in a custom credential stealing page knowledge base may be provided. In particular, each custom credential stealing page profile comprises custom features may be extracted from a web page determined to be a custom credential stealing page. Brand logo profiles stored in a brand logo knowledge base may also be provided, wherein each brand logo profile may include brand logo features extracted from official logos of one or more brands.

The steps performed by the page examination engine may also include: comparing the candidate features to corresponding custom features from each of the custom credential stealing page profiles to generate custom similarity feature sets if the candidate identity information does not match the brand identity information from at least one of the brand profiles and if the candidate web page has not been determined to be a brand-based credential stealing page; comparing the candidate features to corresponding brand logo features from each of the brand logo profiles to generate brand logo similarity feature sets if the candidate identity information does not match the brand identity information from at least one of the brand profiles and if the candidate web page has not been determined to be a brand-based credential stealing page; determining whether the candidate web page is a custom credential stealing page based on the custom similarity features sets and the brand logo similarity feature sets; and providing a graphical interface for displaying information regarding the candidate web page. The displayed information may include: an identity of an infected machine on a network that has accessed the candidate web page if the candidate web page is determined to be a custom credential stealing page; and a feature of the infected machine. The feature may be, for example, a machine location, a machine usage, a MAC ID, a type of machine, a machine operating system, and an identity of a machine user.

In some examples, the method may include calculating a number of known brand logos present on the candidate web page; selecting a record from the custom credential stealing page knowledge base; comparing the selected record to the candidate web page; generating a similarity feature set for the extracted candidate features, the extracted custom features, and the number of known brand logos present on the candidate web page; and determining whether the candidate web page matches the selected record based on analyzing the similarity feature set. If the candidate web page is determined to match the selected record, the candidate web page may be added to the custom credential stealing page knowledge base and a verdict that the candidate web page constitutes a credential stealing attack may be rendered. If the candidate web page is determined not to match the selected record, a new record may be selected from the custom credential stealing page knowledge base and the process may be repeated for the new record. Specifically, the newly selected or new record may be compared to the candidate web page; a similarity feature set may be generated for the extracted candidate features, the extracted custom features, and the number of known brand logos present on the candidate web page; and a determination can be made as to whether the candidate web page matches the new record based on analyzing the similarity feature set. If the candidate web page is determined to match the new record, the candidate web page may be added to the custom credential stealing page knowledge base and a verdict that the candidate web page constitutes a credential stealing attack may be rendered.

The process described above may be repeated until a match between the candidate web page and a record from the custom credential stealing page knowledge base is found or until each record in the custom credential stealing page knowledge has been selected and compared to the candidate web page, at which point, a verdict may be rendered that the candidate web page is benign if the candidate web page does not match any of the records in the custom credential stealing page knowledge base.

In one aspect, a method for detecting a credential stealing attack is provided. The method comprises: (a) loading a candidate web page into a browser memory; (b) interacting with the candidate web page by responding to one or more tests presented by the candidate web page; (c) collecting data related to the behavior of the candidate web page from the browser memory; and (d) determining, using a trained machine learning algorithm, whether the candidate web page is a credential stealing page based on the collected data.

In some embodiments, the collecting data in (b) further comprises extracting identity information and a plurality of features of the candidate web page from the browser memory and comparing the identity information and the plurality of features to a plurality of brand profiles. In some cases, extracting the plurality of features comprises extracting an image, written text, or source code of the candidate web page from the browser memory. In some cases, the method further comprises determining that the candidate web page is not a credential stealing page when the candidate identity information matches the brand identity information from at least one of the plurality of brand profiles. In some cases, the method further comprises determining the candidate web page is a replica of a known brand page by: (a) generating a similarity feature set using the plurality of features and the corresponding brand features and (b) analyzing the similarity feature set using a machine learning-based classifier. For example, the similarity feature set comprises at least one of: visual similarity features, natural language similarity features, and source code similarity features.

In some embodiments, interacting with the candidate web page comprises entering input with aid of a virtual keyboard or virtual mouse. In some cases, the input comprises a dummy credential. In some embodiments, further comprising displaying information regarding the candidate web page on a graphical user interface, which information comprising: (ii) an identity of an infected machine on a network that has accessed the candidate web page if the candidate web page is determined to be a credential stealing page; and (ii) a feature of the infected machine, wherein the feature is selected from the group consisting of a machine location, a machine usage, a MAC ID, a type of machine, a machine operating system, and an identity of a machine user.

In another related yet separate aspect, a system for detecting a credential stealing attack is provided. The system comprises: page examination engine configured to: (a) load a candidate web page into a browser memory; (b) interact with the candidate web page by responding to one or more tests presented by the candidate web page; (c) collect data related to the behavior of the candidate web page from the browser memory; and (d) determine, using a trained machine learning algorithm, whether the candidate web page is a credential stealing page based on the collected data.

In some embodiments, collecting data in (b) further comprises extracting identity information and a plurality of features of the candidate web page from the browser memory and comparing the identity information and the plurality of features to a plurality of brand profiles. In some cases, extracting the plurality of features comprises extracting an image, written text, or source code of the candidate web page from the browser memory. In some cases, the page examination engine is configured to determine that the candidate web page is not a credential stealing page when the candidate identity information matches the brand identity information from at least one of the plurality of brand profiles. In some cases, the page examination engine is configured to determine whether the candidate web page is a replica of a known brand page by: (a) generating a similarity feature set using the plurality of features and the corresponding brand features and (b) analyzing the similarity feature set using a machine learning-based classifier. In some instances, the page examination engine comprises a machine learning-based classifier for determining whether the candidate web page is a replica of a known brand page. In some examples, the input to the machine learning-based classifier comprises a similarity feature set selected from the group consisting of: visual similarity features, natural language similarity features, and source code similarity features.

In some embodiments, the page examination engine is configured to interact with the candidate web page by entering input with aid of a virtual keyboard or virtual mouse. In some cases, the input comprises a dummy credential. In some embodiments, the system further comprises a graphical interface configured to display information regarding the candidate web page, wherein the information comprises: (i) an identity of an infected machine on a network that has accessed the candidate web page if the candidate web page has been determined to be a credential stealing page; and (ii) a feature of the infected machine, wherein the feature is selected from the group consisting of a machine location, a machine usage, a MAC ID, a type of machine, a machine operating system, and an identity of a machine user.

In another aspect, a system for detecting a credential stealing attack may include a page examination engine, which may in turn include an identity validation module, a brand-based credential stealing detection module, a custom credential stealing detection module, a main engine, and a graphical interface. The identity validation module may include a cross validation module and a brand knowledge base. The cross-validation module may be configured to check identity information of a candidate web page against identity information from a legitimate brand page. The brand knowledge base may be configured to store a plurality of profiles of legitimate brand pages.

The brand-based credential stealing detection module may be configured to determine whether a candidate web page is a brand-based credential stealing page, and may include a brand based page rendering module, a brand similarity feature extractor, a brand page matching classifier, and a brand knowledge base. The brand-based page rendering module may be configured to render the candidate web page into a browser memory and to extract an artifact from the candidate web page. The brand similarity feature extractor may be configured to extract different types of features from the candidate web page and from the legitimate brand page to generate a brand similarity feature set. The brand page matching classifier may be configured to receive and analyze the brand similarity feature set to determine whether the candidate page is an exact replica of the legitimate brand page. The brand knowledge base may be configured to store content or profiles of legitimate brand pages.

The custom credential stealing detection module may be configured to determine whether a candidate web page is a custom credential stealing page, and may include a custom credential stealing page rendering module, a custom credential stealing feature extractor, a custom credential stealing detection classifier, a custom credential stealing web sites knowledge base, and a brand logo knowledge base. The custom credential stealing page rendering module may be configured to render the candidate web page into a browser memory and to extract an artifact from the candidate web page. The custom credential stealing feature extractor may be configured to extract different types of features from the candidate web page and from a known custom credential stealing page to form a custom similarity feature set. The custom credential stealing detection classifier may be configured to receive and analyze the custom similarity feature set to determine whether the candidate page matches the known custom credential stealing page. The custom credential stealing web sites knowledge base may be configured to store content or profiles of known custom credential stealing pages. The brand logo knowledge base may be configured to store content or profiles of known brand logos.

The main engine may be configured to manage the identity validation module, the brand based credential stealing detection module, and the custom credential stealing detection module to provide a determination as to whether the candidate web page is a legitimate brand page, a brand based credential stealing page, a custom credential stealing page, or whether the candidate web page is benign.

The graphical interface may be configured to display information regarding the candidate web page. The information may include an identity of an infected machine on a network that has accessed the candidate web page if the candidate web page has been determined to be a brand-based credential stealing page or a custom credential stealing page and a feature of the infected machine. The feature of the infected machine may be, for example, a machine location, a machine usage, a MAC ID, a type of machine, a machine operating system, and an identity of a machine user.

In some embodiments, the brand similarity feature extractor may be configured to: extract an image, written text, or source code from the candidate web page; compare the image, written text or source code extracted from the candidate web page with an image, written text, or source code extracted from each of a plurality of brand profiles stored in the brand knowledge base; and generate a brand similarity feature set based on the comparison of the image, written text or source code extracted from the candidate web page and the image, written text, or source code extracted from each of the brand profiles stored in the brand knowledge base. In some examples, the main engine may be configured to update the brand knowledge base by updating each brand profile in the brand knowledge base. In other examples, the main engine may be configured to update the custom credential stealing web sites knowledge base by storing, in the credential stealing web sites knowledge base, content or profiles of a candidate web page determined to be a custom credential stealing page.

In some embodiments, the custom credential stealing feature extractor may be configured to: extract an image, written text, or source code from the candidate web page; compare the image, written text or source code extracted from the candidate web page with an image, written text, or source code extracted from each of a plurality of custom profiles stored in the custom credential stealing web sites knowledge base; and generate a custom similarity feature set based on the comparison of the image, written text or source code extracted from the candidate web page and the image, written text, or source code extracted from each of the custom profiles stored in the custom credential stealing web sites knowledge base.

In other embodiments, the custom credential stealing feature extractor may be configured to: extract candidate features from the candidate web page; compare the candidate features extracted from the candidate web page with brand logo features extracted from each of a plurality of brand logo profiles stored in the brand logo knowledge base; and generate a brand logo similarity feature set based on the comparison of the candidate features extracted from the candidate web page and the brand logo features extracted from each of the brand logo profiles stored in the brand logo knowledge base.

In another aspect, non-transitory computer-readable storage media encoded with a computer program including instructions executable by a processor for analyzing a candidate web page to detect credential stealing attacks may include a page examination engine software module that may include instructions for: receiving and processing a candidate web page; accessing brand profiles stored in a brand knowledge base, wherein each brand profile comprises brand identity information and brand features extracted from a known brand web page; extracting candidate identity information and candidate features from the candidate web page; comparing the candidate identity information to the brand identity information; determining that the candidate web page is not a credential stealing page if the candidate identity information matches the brand identity information from at least one of the brand profiles; determining whether the candidate web page is a replica of a known brand page by comparing the candidate features to corresponding brand features from each of the brand profiles if the candidate identity information does not match the brand identity information from at least one of the brand profiles; determining that the candidate web page is a brand-based credential stealing page if the candidate web page is determined to be a replica of at least one of the known brand web pages; and displaying information regarding the candidate web page.

In some examples, the displayed information may include an identity of an infected machine on a network that has accessed the candidate web page if the candidate web page is determined to be a brand-based credential stealing page and a feature of the infected machine. The feature may be selected from the group consisting of a machine location, a machine usage, a MAC ID, a type of machine, a machine operating system, and an identity of a machine user.

In other examples, the instructions may include: accessing custom credential stealing page profiles stored in a custom credential stealing page knowledge base, wherein each custom credential stealing page profile comprises custom features extracted from a web page determined to be a custom credential stealing page; accessing brand logo profiles stored in a brand logo knowledge base, wherein each brand logo profile comprises brand logo features extracted from official logos of one or more brands; comparing the candidate features to corresponding custom features from each of the custom credential stealing page profiles to generate custom similarity feature sets if the candidate identity information does not match the brand identity information from at least one of the brand profiles and if the candidate web page has not been determined to be a brand-based credential stealing page; comparing the candidate features to corresponding brand logo features from each of the brand logo profiles to generate brand logo similarity feature sets if the candidate identity information does not match the brand identity information from at least one of the brand profiles and if the candidate web page has not been determined to be a brand-based credential stealing page; and determining whether the candidate web page is a custom credential stealing page based on the custom similarity features sets and the brand logo similarity feature sets. The displayed information may include: an identity of an infected machine on a network that has accessed the candidate web page if the candidate web page is determined to be a custom credential stealing page and a feature of the infected machine. The feature of the infected machine may be, for example, a machine location, a machine usage, a MAC ID, a type of machine, a machine operating system, and an identity of a machine user.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

FIG. 8 is a screen capture of an Event Notification and Command and Control Information page viewed via an interface of an exemplary embodiment.

FIG. 9 is a screen capture of an Event Notification and Malware Detail page viewed via an interface of an exemplary embodiment.

FIG. 10 is a screen capture of an Event Notification and Hacker Group Detail page viewed via an interface of an exemplary embodiment.

DETAILED DESCRIPTION

Figure 1:
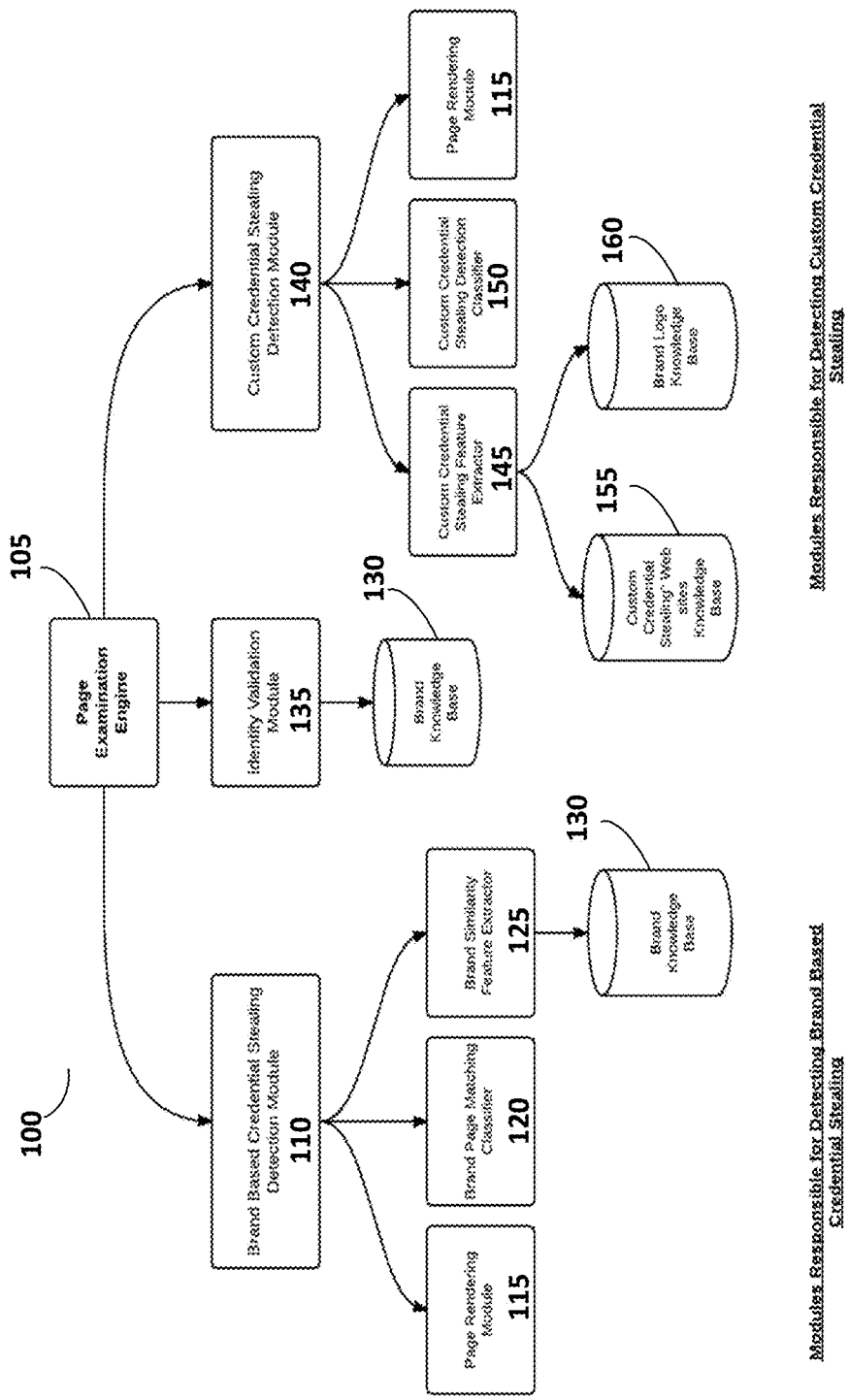
FIG. 1 is a block diagram showing a number of functional components of an embodiment of an Active Vision System.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Specific embodiments of the disclosed method and system will now be described with reference to the drawings.

Nothing in this detailed description is intended to imply that any particular step, component, or feature is essential to the invention.

An Active Vision detection method and system for detecting credential stealing attacks using an automated machine-learning page examination engine may be used to detect both brand-based and custom credential stealing attacks. The approach disclosed herein assumes that if a candidate web page is a replica of a known Brand Page (i.e. an original legitimate web page associated with a brand or trustworthy entity) but the identity as determined by identification information such as a URL or an SSL Certificate of the candidate web page does not match with that of a known brand or if a candidate web page is a replica of a known Credential Stealing Page or has certain text, visual and source code features known to be only associated with Credential Stealing Pages, then it must be a Credential Stealing Page. The efficacy of the similarity analysis may be achieved through supervised machine learning and is comparable to human analysis. In a preferable embodiment, the classifiers responsible for establishing similarity are binary in nature and have only two outputs.

The Active Vision System is also capable of self-learning; every new attack detected by the system becomes part of system's long-term memory making it incrementally more accurate in future predictions using its past experience.

The Active Vision System may comprise modules, sub-modules, feature extraction modules, classifiers and databases. Databases or knowledge bases are data repositories that hold vital information about a set of archived web pages that may be stored as profiles and that may include identity information and various features extracted from the web pages. The system may comprise two, three, four, or more different types of knowledge bases. Classifiers may include binary classifiers. Binary classifiers may comprise supervised machine learning models that help the overall system in making accurate predictions. These classifiers may first be trained by human experts on a set of training data and may later be used for prediction in real time. The system may comprise one, two, three, four or more different types of classifiers. The classifiers can be of any suitable type, including but not limited to, KNN (k-nearest neighbor), support vector machine (SVM), a naïve Bayes classification, a random forest, decision tree models, convolutional neural network (CNN), feedforward neural network, radial basis function network, recurrent neural network (RNN), deep residual learning network and the like. Feature extraction modules may compare and extract various features from a Candidate Page and from pages stored in the knowledge bases explained above based on Visual, Natural Language, and Source Code analysis. These features may then be used by the binary classifiers to determine whether the Candidate Page is a legitimate brand page or whether it is a look-alike, fake, or impostor page that may be devised to implement a credential stealing attack. The system may comprise ten, eleven, twelve, thirteen, fourteen, fifteen or more modules or major components.

FIG. 1 represents a block diagram showing a number of functional components of an embodiment of an Active Vision System. As shown in FIG. 1, a preferable embodiment of an Active Vision System (100) may comprise a Page Examination Engine (105), which may further comprise three functional modules: an Identity Validation Module (135), a Brand Based Credential Stealing Detection Module (110), and a Custom Credential Stealing Detection Module (140).

A Page Examination Engine (105) may comprise a main engine to manage one or more modules or sub-modules used to determine whether a given page or Candidate Page (not shown) is not what it is purported to be based on its appearance to the user. Such a page may be merely posing as a legitimate brand page while it is actually attempting to steal a user's credentials. This main engine may be responsible for controlling all of the modules or sub-modules in order to output a single verdict i.e. that the Candidate Page is a Credential Stealing Page (i.e. a fake or impostor page that may be attempting to steal a user's credentials) or that it is not a Credential Stealing Page.

An Identity Validation Module (135) may comprise a cross validation module that may check identity information such as URL Domain, SSL Certificate, and Domain WHOIS information of a Candidate Page (i.e. candidate identity information) against identity information from the profiles of legitimate brand pages (i.e. brand identity information) stored in the Brand Knowledge Base (130). If there is a match between the candidate and the brand identity information, it may be determined that no further investigation is needed and the Candidate Page may be identified as benign. In case of a mismatch, the Candidate Page may be marked as under investigation for further analysis.

Brand Knowledge Bases may comprise data repositories that hold vital information about a set of archived known brand web pages. This knowledge base may store content (e.g. Images, Text, and Source Code) and identification and/or identity information (e.g. URL, Domain, SSL information and Email address) about known brand web pages that belong to some of the world's most popular global brands like Yahoo, Gmail, Hotmail, Dropbox, Amazon, PayPal, Banking Websites to name a few, the brand list may also include corporate web sites owned by legitimate entities like the login page of a company's employee portal etc. All these web pages from now onward will be referred collectively as "Brand Web Pages". These brand web pages may be classified as falling into various categories or types such as Sign-in Pages, Sign-up Pages, Forgot password pages and Password Recovery Pages. One example of a brand page is a Yahoo Email Sign-in page. A Brand Knowledge Base (130) may hold vital identify information corresponding to each of these brand pages, including for example, Domain, SSL information and Domain ownership records. For instance, in the case of a Yahoo Email sign-in page the identity information may be: Domain=mail.yahoo.com, SSL Cert Owner=Yahoo, Inc., Domain owner for mail.yahoo.com=Yahoo, Inc. A Brand Knowledge Base (130) may also store information about whether these pages are normally served over http or https.

A Page Examination Engine (105) may comprise a Brand Based Credential Stealing Detection Module (110). The Brand Based Credential Stealing Detection Module (110) may comprise a sub-module dedicated to detecting if a Candidate Page is using a known brand replica page as a Credential Stealing scheme or not. To accomplish this task, this module may comprise one or more sub-modules including, for example, a Page Rendering Module (115), a Brand Page Matching Classifier (120), a Brand Similarity Feature Extractor (125), and a Brand Knowledge Base (130).

A Page Rendering Module (115) may be used for loading/rendering a Candidate Page into a browser memory (not shown) and for extracting the rendered webpage's Image, written text, and source code from the browser memory. Extracting these artifacts from the browser memory instead of fetching it directly from the web server may avoid opportunities for encryption, obfuscation and encoding.

A Brand Similarity Feature Extractor (125) may comprise a component that compares a Candidate Page with content or profiles stored in the Brand Knowledge Base (130) in order to extract different types of features to form similarity feature sets. The features may be extracted based on a Visual, a Natural Language, and a Source Code similarity analysis. These extracted similarity features sets may comprise features extracted from the Candidate Page and from a given brand page. The similarity feature sets may be sent or passed to the Brand Page Matching Classifier (120).

A Brand Page Matching Classifier (120) may comprise a binary classifier used to make a prediction as to whether a Candidate Page is a replica of any of the brand pages whose profiles are stored in the Brand Knowledge Base (130) based on the similarity feature sets received from the Brand Similarity Feature Extractor (125). The features used to make this prediction may be extracted based on a Visual, a Natural Language, and a Source Code similarity analysis.

A Custom Credential Stealing Detection Module (140) may comprise a sub-module used to determine whether a Candidate Page is a Custom Credential Stealing Page. This module may comprise other sub-modules including: a Custom Credential Stealing Feature Extractor (145), a Custom Credential Stealing Detection Classifier (150), a Page Rendering Module (115), a Custom Credential Stealing Knowledge Base (155), and a Brand Logo Knowledge base (160) to accomplish this task.

A Custom Credential Stealing Websites Knowledge Base (155) may comprise data repositories that hold vital information about a set of archived Custom Credential Stealing Pages. These Custom Credential Stealing Pages are known or have been determined to be fake or impostor webpages that may be attempting to steal a user's credentials but that do not appear to be exact replicas of brand pages. This knowledge base may store content (e.g. Images, Text, and Source Code) and identification and/or identity information (e.g. URL, Domain and SSL information) about known or identified Custom Credential Stealing Pages. This knowledge base may first be populated at the training phase by human experts. Later the system may keep updating this knowledge base on its own automatically as it detects more and more Custom Credential Stealing Pages. In addition, a Brand Logo Knowledge Base (160) may store content and information about official logos of different global brands that are commonly targeted in Credential Stealing attacks.

A Custom Credential Stealing Feature Extractor (145) may comprise components that compare a Candidate Page with content or profiles stored in a Custom Credential Stealing Websites Knowledge Base (155) and/or a Brand Logo Knowledge Base (160) in order to extract different types of features to form similarity feature sets. The features may be extracted based on a Visual, a Natural Language, and a Source Code similarity analysis. These extracted similarity features sets may comprise features extracted from the Candidate Page and from a given custom credential stealing page and/or from a brand logo. The similarity feature sets may be sent or passed to the Custom Credential Stealing Detection Classifier (150).

A Custom Credential Stealing Detection Classifier (150) may comprise a binary classifier used to make a prediction as to whether a Candidate Page is a Custom Credential Stealing Page (i.e. a fake or impostor page that may be attempting to steal a user's credentials but that does not appear to be a replica of a known brand page) based on the similarity feature sets received from the Custom Credential Stealing Feature Extractor (145). The features used to make this prediction may be extracted based on a Visual, a Natural Language, and a Source Code similarity analysis. This classifier may come into play where the Candidate Page does not appear to be an exact replica of a known brand page. In such a case, the Brand Page Matching Classifier (120) may fail to detect a Candidate Page as a Brand-based Credential Stealing Page and further investigation may be needed to determine whether the Candidate Page poses a threat of credential stealing.

The Active Vision detection method may comprise a two-stage process, wherein the stages are herein referred to as Stage 1 and Stage 2 respectively. The two-stage process may be needed to accurately detect both types of Credential Stealing attacks, namely, brand-based and custom credential stealing attacks. In a preferable embodiment, the two-stage process may be implemented by the Brand Based Credential Stealing Detection Module (110) and Custom Credential Stealing Detection Module (140) respectively.

The Active Vision System may first match a Candidate Page's vital identify information such as the URL Domain, SSL Certificate, and Domain WHOIS information with brand identity information from brand profiles stored in the Brand Knowledge Base (130). If there is a match it may be assumed that the Candidate Page belongs to a legitimate entity and there is no need to investigate further. If the identity information is not matched, then the next step may be to determine whether the Candidate Page is a Credential Stealing page or an unrelated legitimate web page.

In Stage 1, the system may determine whether the Candidate Page is a look-alike page of a known brand page that appears to be an exact replica of the brand page. If it is a look-alike page posing as a brand page, it may be labeled as a Brand-based Credential Stealing page. However, even if the Candidate Page does not appear to be an exact replica of a known brand page, there still is a chance that it is a fake or impostor page (i.e. a Custom Credential Stealing Page). This is where Stage 2 may come into play. In Stage 2, the system may determine whether the Candidate Page falls under the Custom Credential Stealing category.

Figure 2:
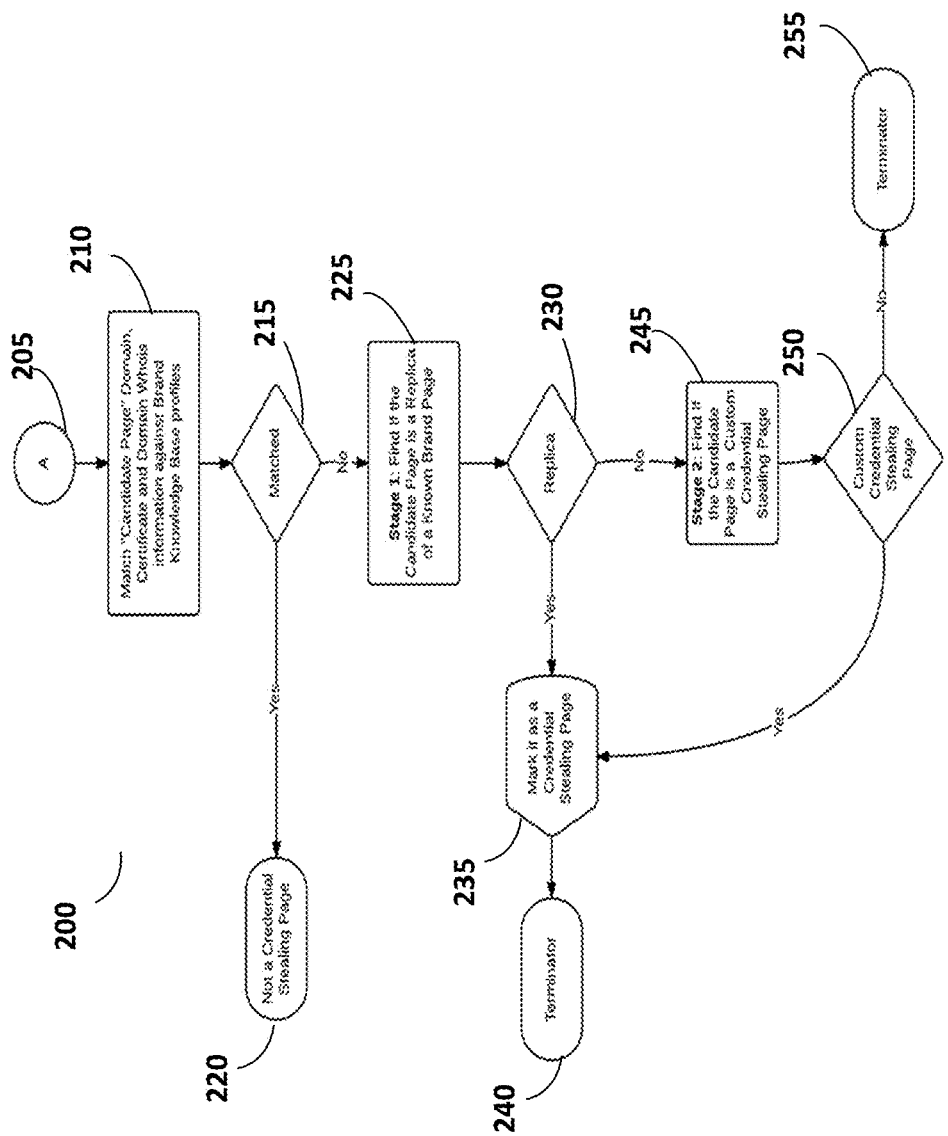
FIG. 2 is a flowchart showing an exemplary method for detecting credential stealing attacks.

FIG. 2 is a flowchart showing an exemplary method (200) for detecting credential stealing attacks. A Candidate Page (A) may be selected. Components, features, or elements of the Candidate Page including candidate identity information such as the Candidate Page URL Domain, SSL Certificate and Domain WHOIS information and the corresponding brand identity information from one or more Brand Knowledge Base profiles (210) may be matched (215). If a match is found then the Candidate Page (A) may be classified as Not a Credential Stealing Page (220). If the candidate identity information from Candidate Page (A) is not matched to the brand identity information from any of the brand profiles, then the method proceeds to Stage 1 (225) of the two-stage process. Stage 1 (225) may determine whether the Candidate Page is a replica (230) of a known brand page. If the Candidate Page (A) is identified as a replica then the Candidate Page (A) may be labeled as a Brand-based Credential Stealing Page (235). At this point, a Terminator procedure may be initiated (240) indicating that the system has determined a verdict as to whether the Candidate Page constitutes a credential stealing attack. If the Candidate Page (A) is not identified as a replica, then the method may proceed to Stage 2 (245). Stage 2 (245) may be used to determine whether the Candidate Page (A) is a Custom Credential Stealing Page. If the page is determined to be a Custom Credential Stealing Page, then the Candidate Page (A) is labeled as a Credential Stealing Page (235) and a Terminator procedure may be initiated (240) indicating that the system has determined a verdict as to whether the Candidate Page constitutes a credential stealing attack. If the Candidate Page (A) is not classified as a Custom Credential Stealing Page (250), then a Terminator procedure may be initiated (240) without labeling the Candidate Page as a Credential Stealing Page and the system may return a verdict that the Candidate Page is benign.

Figure 3:
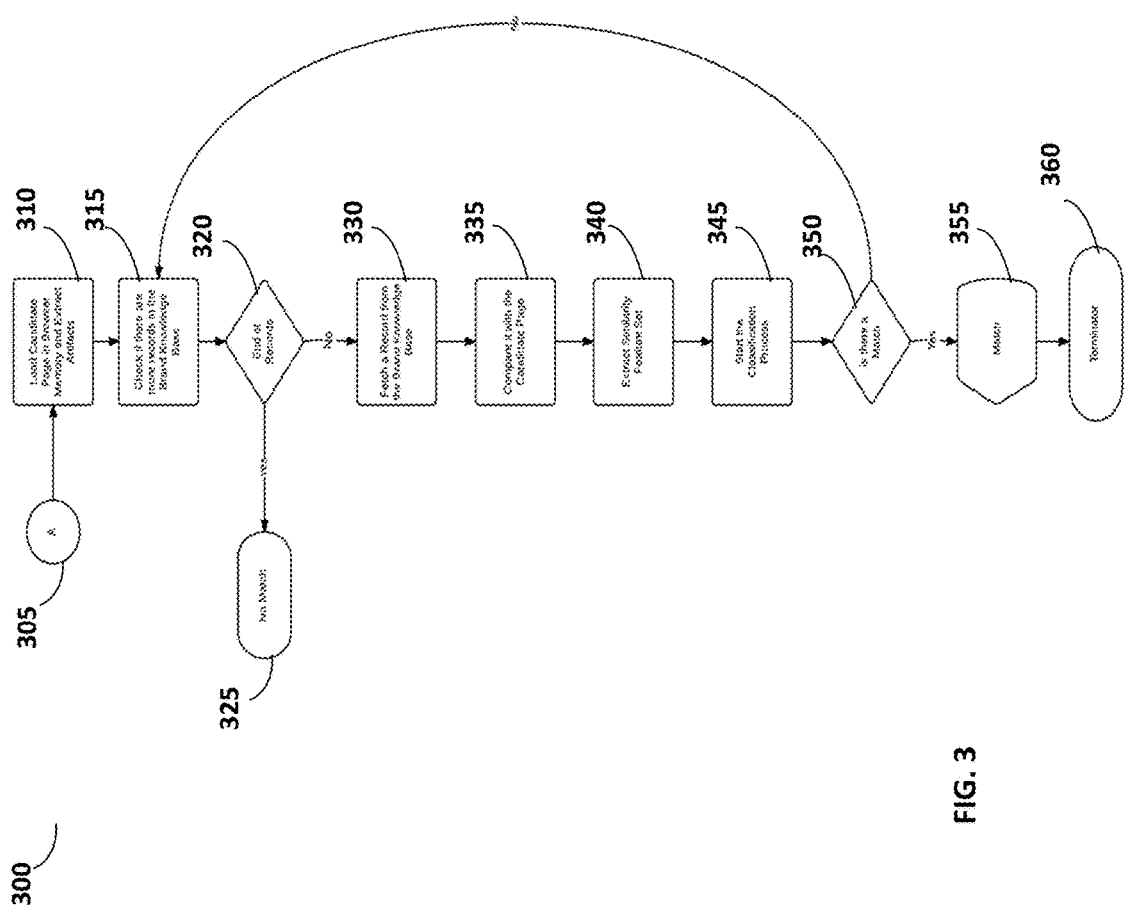
FIG. 3 is a flowchart showing an exemplary method for detecting brand-based credential stealing attacks.

FIG. 3 is a flowchart showing Stage 1 of the method (300) for detecting custom credential stealing attacks. First a Candidate Page (A) (305) may be selected and loaded into a browser memory, where key artifacts may be extracted (310). Similar features from artifacts extracted from the Candidate Page may be extracted from artifacts of profiles stored in the Brand Knowledge Base. This may be done for all records or brand page profiles in the Brand Knowledge Base. The Brand Knowledge Base may be checked to determine if there are records to be processed (315). If an end to all the records in the Brand Knowledge Base is reached and all Brand Knowledge Base records have been assessed (320) then there may be no significant matches (325) between the artifacts extracted from the Candidate Page (A) and the artifacts of the Brand Knowledge Base records. If the end of records (320) is not reached, a record may be fetched from the Brand Knowledge Base (330). A comparison may be made with features from a selected record associated with a brand page (e.g. a brand profile) retrieved from the Brand Knowledge Base and features extracted from the Candidate Page (335). A similarity feature set may be extracted and generated from the Candidate Page (A) and the selected record stored within the Brand Knowledge Base (340). These feature sets may be used to classify (345) the Candidate Page (A) relative to each of the records stored in the Brand Knowledge Base, and determine whether there is a match (350). If no match is found, the Brand Knowledge Base may be checked to determine if there are more records to be processed (315). The subsequent record may then follow the procedure used to process each of the prior records, namely, the subsequent record may be fetched from the Brand Knowledge Base (330), the selected record associated with a brand page may be compared with the Candidate Page (335), a similarity feature set may be extracted (340), the Candidate Page may undergo classification (345), and determination of a match may be made (350). Steps 315, 320, 330, 335, 340, 345, and 350, may repeat until either the end of records is reached without a match (325), or a match is identified (355) and the sequence is terminated (360).

The modules and sub-modules described in FIG. 1 may participate in Stage 1 of any method disclosed herein. At Stage 1, the Page Examination Engine (105) hands over or passes the Candidate Page identity information such as the URL to the Brand Based Credential Stealing Detection Module (110) for a determination as to whether or not the Candidate Page is a Brand-based Credential Stealing page. A Brand Based Credential Stealing Detection Module (110) may further invoke the Page Rendering Module (115) to load/render the Candidate Page in the Browser Memory by extracting its image, written text, and source code. The image, written text, and source code of the Candidate Page may then handed over or passed to the Brand Similarity Feature Extractor (125) to extract similarity features by comparing artifacts (e.g. candidate features) extracted from the Candidate Page with artifacts (e.g. brand features) from each of the brand profiles stored in the Brand Knowledge Base (130) to generate extracted similarity feature sets. The extracted similarity feature set may then be handed over or passed to the Brand Page Matching Classifier (120) module to determine whether the Candidate Page appears to be a replica of any of the brand pages stored in the Brand Knowledge Base (130). If a match is found as a result of comparing the candidate features to the brand features based on the similarity feature sets, the system may flag the Candidate Page as a Brand-based Credential Stealing Page. If no match is found, the system may proceed to Stage 2 of the two-stage process.

Figure 4:
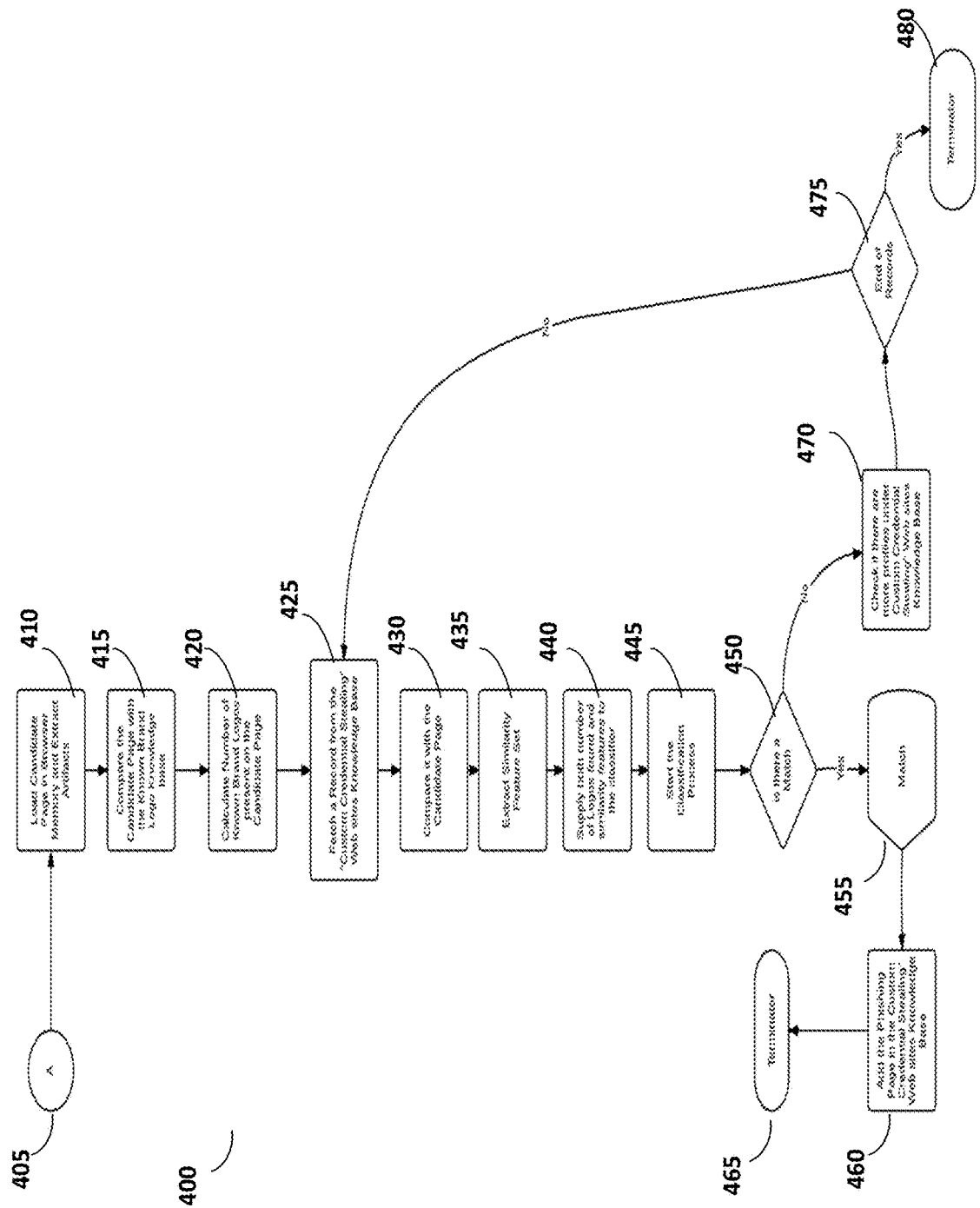
FIG. 4 is a flowchart showing an exemplary method for detecting custom credential stealing attacks.

FIG. 4 is a flowchart showing Stage 2 of a method (400) for detecting custom credential stealing attacks. A Candidate Page (A) (405) may be selected and loaded into a browser memory and one or more artifacts (e.g. candidate features) may be extracted (410). The Candidate Page (A) may be compared with artifacts from brand logo profiles stored in the Known Brand Logo Knowledge Base (415). In a preferable embodiment, the number of Known Brand Logos present on the Candidate Page may be calculated (420). A record (e.g. a custom profile associated with a known or identified Custom Credential Stealing Page) from the Custom Credential Stealing Websites Knowledge Base may be fetched (425) and compared (430) with the Candidate Page (A). A similarity feature set may be generated (435) from extracted candidate features, from custom features (e.g. features extracted from custom profiles), and from the numbers of logos found on the Candidate Page. The generated similarity feature set may then be supplied to the classifier (440). The classification process may be started (445) and a determination made as to whether a match based on analyzing the similarity feature set does or does not exist (450). If a match is found (455) then the Candidate Page (A) may be identified or classified as a Custom Credential Stealing Page and it may be added to the Custom Credential Stealing Websites Knowledge Base (460). A termination sequence may then be initiated (465) indicating that the system has determined a verdict as to whether the Candidate Page constitutes a credential stealing attack. If a match is not identified (450), then the method proceeds to check whether there are more profiles or records in the Custom Credential Stealing Websites Knowledge Base (470) to process. If there are more records, another record may be fetched (425), compared with the Candidate Page (430), features from each record may be extracted and a similarity feature set generated (435), the number of logos and features may be supplied to the classifier (440), and classification (445) as well as a match determination (450) may be made. This sequence of 425, 430, 435, 440, 445, and 450 may repeat until either a match is identified (455), or no records remain (475) in the Custom Credential Stealing Websites Knowledge Base, which will trigger initiation of a termination sequence (480) that no match has been found. The system may then return a verdict that the Candidate Page is benign.

One or more modules and sub-modules described in FIG. 1 may participate in Stage 2 of any method disclosed herein. The purpose of Stage 2 may be to determine if the Candidate Page is a Custom Credential Stealing Page or not. At this stage, both the image and source code of the Candidate Page may be handed over or passed to the Custom Credential Stealing Feature Extractor (145) that extracts features and generates a similarity feature set between the Candidate Page and each record or profile stored in the Custom Credential Stealing Knowledge Base (155) and Brand Logo Knowledge Base (160). The similarity feature sets may be handed over or passed to the Custom Credential Stealing Detection Classifier module (150), which determines whether or not the Candidate Page is a Custom Stealing Page. If a match is found based on the similarity feature sets, the system may flag the Candidate Page as a Credential Stealing Page that falls under the Custom category. If no match is found, the system may classify the Candidate Page as a legitimate or authentic page, and the sequence may stop or terminate.

Figure 5:
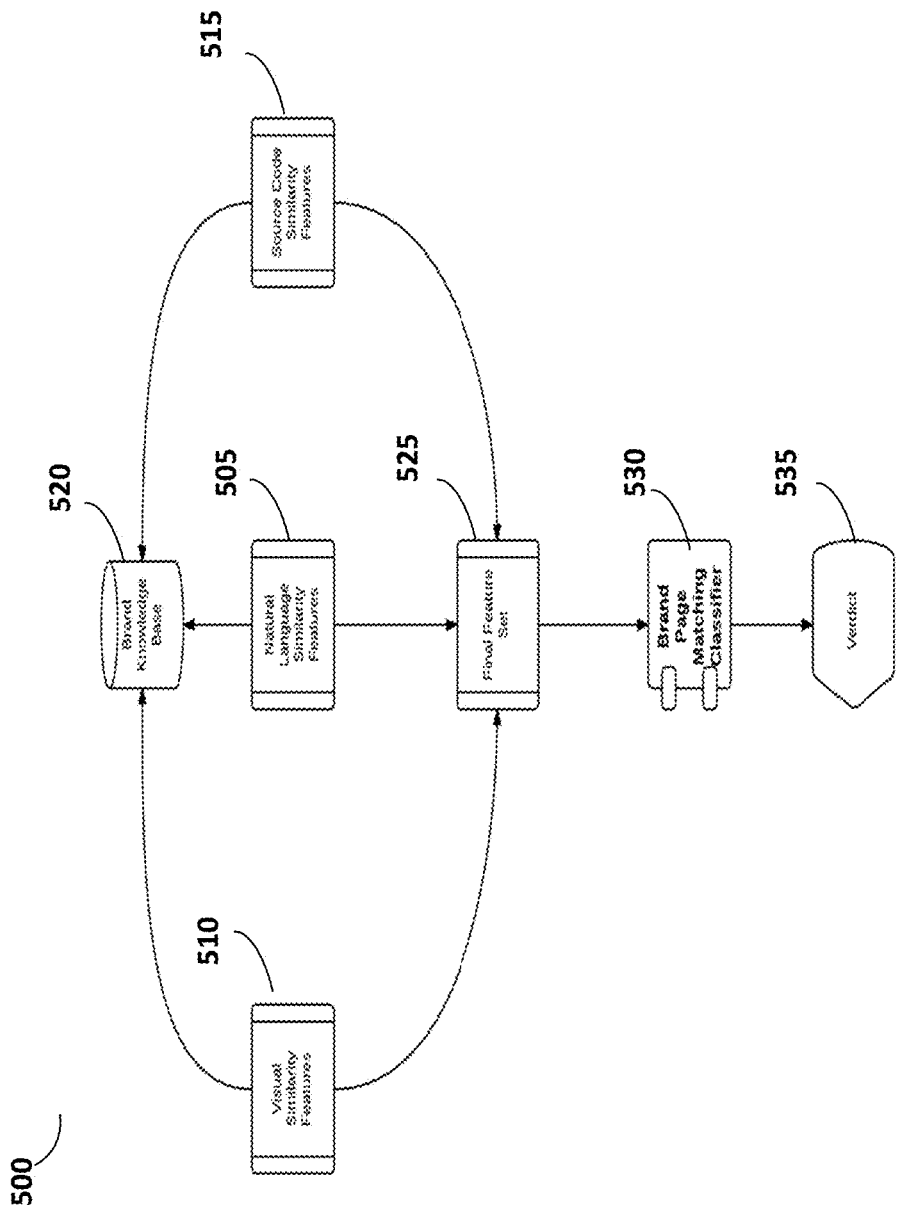
FIG. 5 is a flowchart providing further details of the exemplary method of FIG. 3.

FIG. 5 is a flowchart providing further details on the classification process (500) used in an exemplary method of FIG. 3. The purpose of this classification process may be to find out if a Candidate Page looks similar to a known brand page or not. This classification system may comprise binary classification criterion based on supervised machine learning that has just two outcomes "matched" or "not-matched." FIG. 5 depicts the classification method. Three types of feature categories: Visual Similarity Features (510), Natural Language Similarity Features (505), and Source Code Similarity Features (515), are extracted from records in the Brand Knowledge Base (520) to generate similarity feature sets in the Final Feature Set (525). These similarity feature sets are then fed into a Brand Page Matching Classifier (530) which processes and analyzes the similarity feature sets to compute a verdict (535).

Visual Similarity Features may be extracted through visual analysis. As part of this analysis, the image file of a candidate page may be compared to each of the individual Brand Page Image files stored in the brand profiles in the Brand Knowledge Base. Each comparison may generate one or more features which may include: total graphical interest points available in the Candidate Page, total graphical interest points available in a Brand Page, Graphical Interest points matched between the Candidate and a Brand Page, Image Size of the Candidate Page or Image Size of a Brand Page.

Natural Language Similarity Features may be related features that are extracted by analyzing text written on the Candidate Page and comparing it with text written on a Brand Page. Such analysis may include or consider natural language used on the Candidate Page, natural language used on the Brand Page, percentage of text matched between the Candidate Page and Brand Page, number of user inputs required by the Candidate Page, number of user inputs required by a Brand Page, number of readable paragraphs in the Candidate Page, number of readable paragraphs in a Brand Page.

Source Code Similarity Features may be used to check if there is a source code similarity between the candidate page and a known Brand Page. An analysis of source code similarity features may include taking into account: percentage of html source code matched between the Candidate Page and a Brand Page, percentage of style-sheet code matched between the Candidate Page and a Brand Page, number fonts and size matched between the Candidate Page and a Brand Page, number of external hyperlinks links matched between the Candidate Page and a Brand Page, and number of internal hyperlinks links matched between the Candidate Page and a Brand Page.

Figure 6:
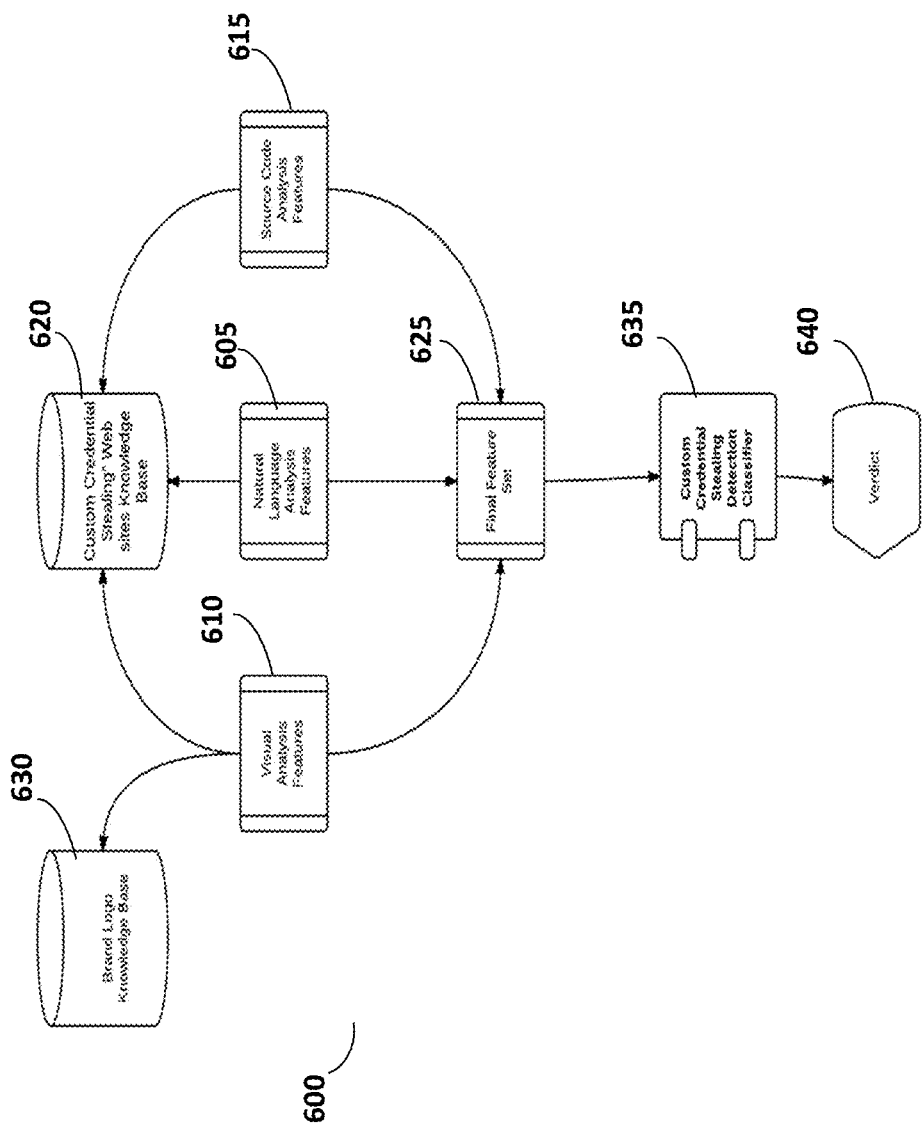
FIG. 6 is a flowchart providing further details of the exemplary method of FIG. 4.

FIG. 6 is a flowchart providing further details for the classification process (600) used in exemplary method of FIG. 4. The purpose of this second stage classification process may be to detect credential stealing attacks where the Credential Stealing Pages do not appear to be an exact replica of a brand page. These Custom Credential Stealing Pages will typically have some resemblance to a particular brand page, for example by displaying brand logos and brand names, but the overall page layout and information being asked may be different from a brand page. As part of this second stage classification, a Candidate Page is cross compared with known Custom Credential Stealing Pages and known brand logos. The classification model may comprise one or more classifiers. Classification may be based on a supervised or self-learning machine learning models that has only two outcomes—either it is a Custom Credential Stealing Page or it is a Benign Page.

The Candidate Page may be compared with known Custom Credential Stealing Pages stored in the Custom Credential Stealing Websites Knowledge Base (620), and known brand logos stored in the Brand Logo Knowledge Base (630). The comparison may be made by extracting features from the candidate page and comparing these against similar features extracted from the Custom Credential Stealing Pages and known brand logos. These extracted features may be divided into three categories: Visual Analysis Features, Natural Language Analysis Features, and Source Code Analysis Features.

FIG. 6 depicts a classification method (600). Three types of feature categories, Visual Similarity Features (610), Natural Language Similarity Features (605), and Source Code Similarity Features (615), are extracted from records in the Custom Credential Stealing Website Knowledge Base (620) to generate similarity feature sets in the Final Feature Set (625). The Visual Similarity Features (610) may also be extracted from records in the Brand Logo Knowledge Base (630). The generated similarity feature sets are then fed into a Custom Credential Stealing Detection Classifier (635) which processes and analyzes the similarity feature sets to compute a verdict (640).

Visual Analysis Features may comprise features extracted through visual analysis. As part of this visual analysis, one or more image files of the candidate may be compared to each Custom Credentials Stealing Image file stored in a custom profile in the Custom Credential Stealing Websites Knowledge Base. In a preferable embodiment, the image file may be compared with an image file from a brand logo stored in the Brand Logo Knowledge base to determine whether the Candidate Page contains one or more brand logos. Each comparison may result in identifying features used to generate similarity feature sets, including: total number of brand logos found on the Candidate Page, total graphical interest points available on the Candidate Page, total graphical interest points available on a Custom Credential Stealing Page, and graphical interest points matched between the Candidate and a Custom Credential Stealing Page, dimensions of Candidate and Custom Credential Stealing Page, their background Color, the matching rate, intensity and color composition etc.

Natural Language Analysis Features may perform one or more functions. In a preferable embodiment, Natural Language analysis may be used to determine whether there is text similarity between the candidate page and a known Credential Stealing Page. Natural Language Analysis Features may further be used to understand the whole purpose behind the candidate page e.g. is the page asking for confidential information like Username, Password, Social Security number etc., or it's just meant for simple reading. To perform the text similarity analysis, a syntactic analysis on the Candidate Page's text data may be performed and cross referenced with text against each Custom Credential Stealing. Based on this comparison a text similarity index may be calculated. A similarity index can vary from between 0 to 100%. In order to find the type of information being asked by the Candidate Page, overall text may be divided in multiple segments like simple reading paragraphs, headlines, labels of the input controls like buttons and password fields. Labels extracted from the input fields may be analyzed through dictionary and grammar analysis to understand their meanings. An English translation for these labels may be performed if system detects the language being used is not English. This whole analysis may result in a certain number of categorical (e.g. binary) and numeric features that are later used to classify the Candidate Page. Features used in the analysis may include: Text similarity index between the Candidate Page and a Custom Credential Stealing Page, Total number of input fields on the Candidate Page, Is the Candidate Page asking for a passwords, Is the Candidate Page asking for Social Security number, and Is the Candidate Page asking for an ATM Pin, number of paragraphs, number of lines, natural language in use like English, French, Korean etc., common substrings etc. In some case, the features may also comprise behavior of the candidate page during an interaction between the candidate page and the system. For example, a credential stealing page may accept any dummy credential submitted by the system. In another example, evasion techniques may be performed by a malicious server before leading to the actual phishing page or malicious contents. Details about the evasion behaviors and interactions performed by the system to bypass such evasions are described later herein.

In a preferable embodiment, Source Code Analysis Features may perform the purpose of understanding how the Candidate Page is collecting and sending confidential information. Features used in this analysis may include: the number of hyperlinks pointing to un-trusted domains, the number of hyperlinks pointing to trusted-domains, the number of user inputs, the number of Password fields on the Candidate Page, whether there is a "Submit form" on the Candidate Page, and the Protocol being used to submit the information, e.g. is it "http" or "https.", meta tags, title of the page etc.

Once a Candidate Page is declared a Custom Credential Stealing Page it may be added as a new custom profile in the Custom Credential Stealing Websites Knowledge Base. Moreover, the Brand Knowledge base may get periodically updated with the most of up-to-date Profile pages.

Almost all of the global brands keep their web sites dynamic. For example, their sign-in and sign-up pages are periodically updated visually and textually. Thus, in order to the keep the Brand Knowledge base up-to-date with current elements of these known brands, an autonomous process may be provided to periodically access the brand web sites over the internet and to download the most up-to-date image files, text, and source code automatically.

Figure 7:
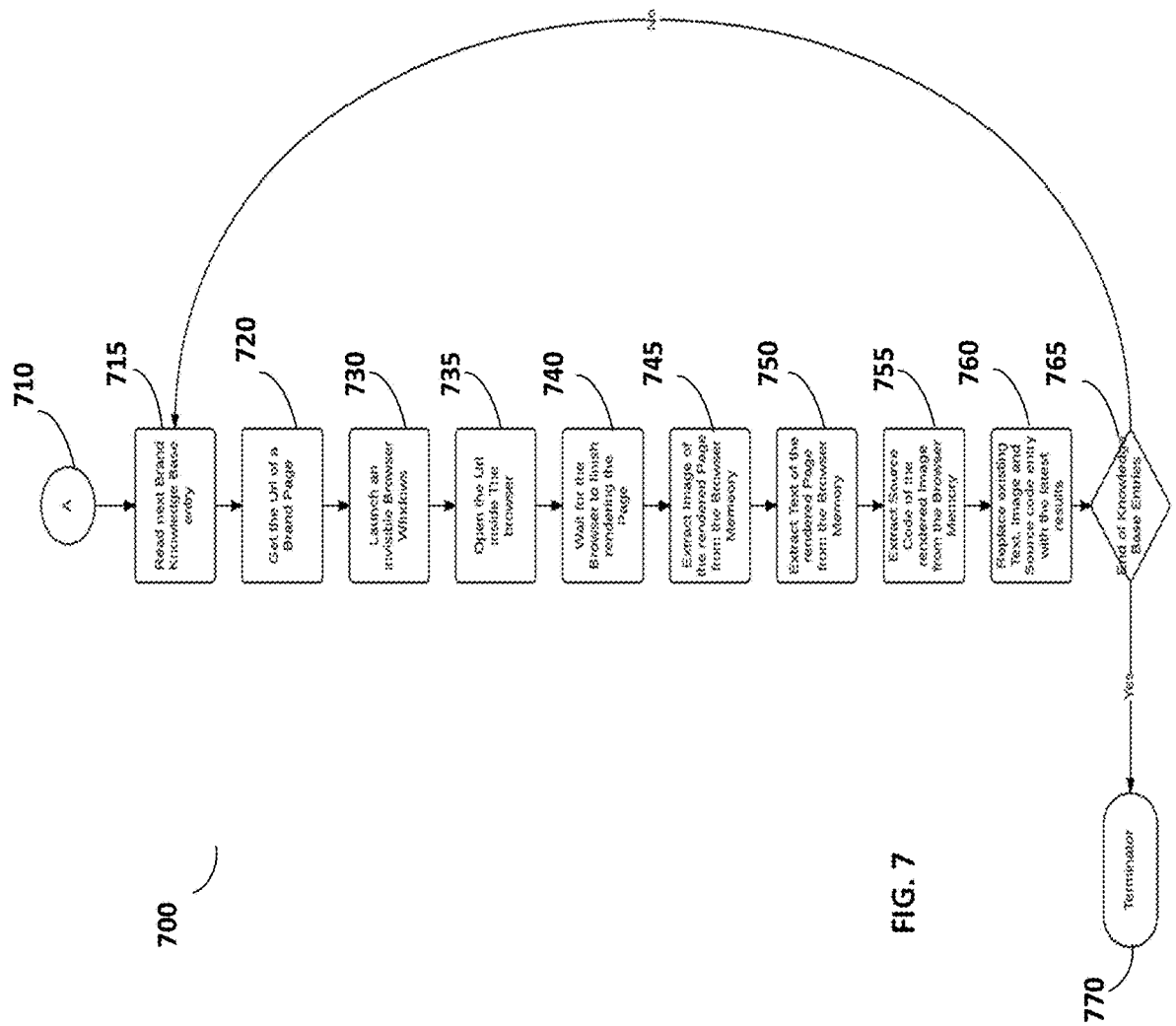
FIG. 7 is a flowchart showing an exemplary method for updating a knowledge base for an embodiment of an Active Vision System.

FIG. 7 is a flowchart showing an exemplary method for updating a knowledge base for an embodiment of an Active Vision System. As shown in FIG. 7, a method for updating (700) may start by accessing the Brand Knowledge Base at (A) (710). The next Brand Knowledge Base entry (e.g. a record or brand profile) may be read (715) and the URL of a brand page may be obtained (720). An invisible browser window may be launched (730) and subsequently, the URL of the brand page may be opened inside the browser (735) and the brand page may be loaded, rendered, and stored in the browser memory. After the system has waited for the browser to finish rendering the brand page (740), an image of the rendered brand page may be extracted from the browser memory (745). In addition, text (750) of the rendered brand page and source code (755) of the rendered image may also be extracted from the browser memory (750). The system may then replace existing text, image, and source code of the entry (e.g. record or brand profile) with the latest results (760) thus updating the brand profile. The system queries whether it has reached the end of the Brand Knowledge Base entries. If the system has not reached the end and there are still more brand profiles to be updated, the method proceeds to read the next Brand Knowledge Base entry (715). If the system has reached the end and there are no more brand profiles to be updated, the method terminates (770) and the updating process is complete.

Using these systems and methods, the Active Vision System may learn from its past experience and from environmental changes. Accordingly, with time the Active Vision System may become incrementally more accurate in its future predictions.

An Active Vision System may perform real-time classification of Candidate Pages as either NOT Credential Stealing pages or as Credential Stealing pages. When a computer on a network accesses a page identified as a Credential Stealing page, the identity of the computer, details regarding the computer, and information regarding the Credential Stealing page may be made accessible to a user or system administrator so that the user or system administrator may catalog, record, or take action in response to the information.

The Active Vision System may display or present information to a user or system administrator through a user interface, or portal. A user or system administrator may login to the portal or access the portal by entering a user name and password. In some instances, login may require two factor authentication, wherein the user must authenticate by providing a password that was supplied through other means e.g. by a dongle, via text to a mobile device or through an eternal application run on a mobile device.

Figure 8:
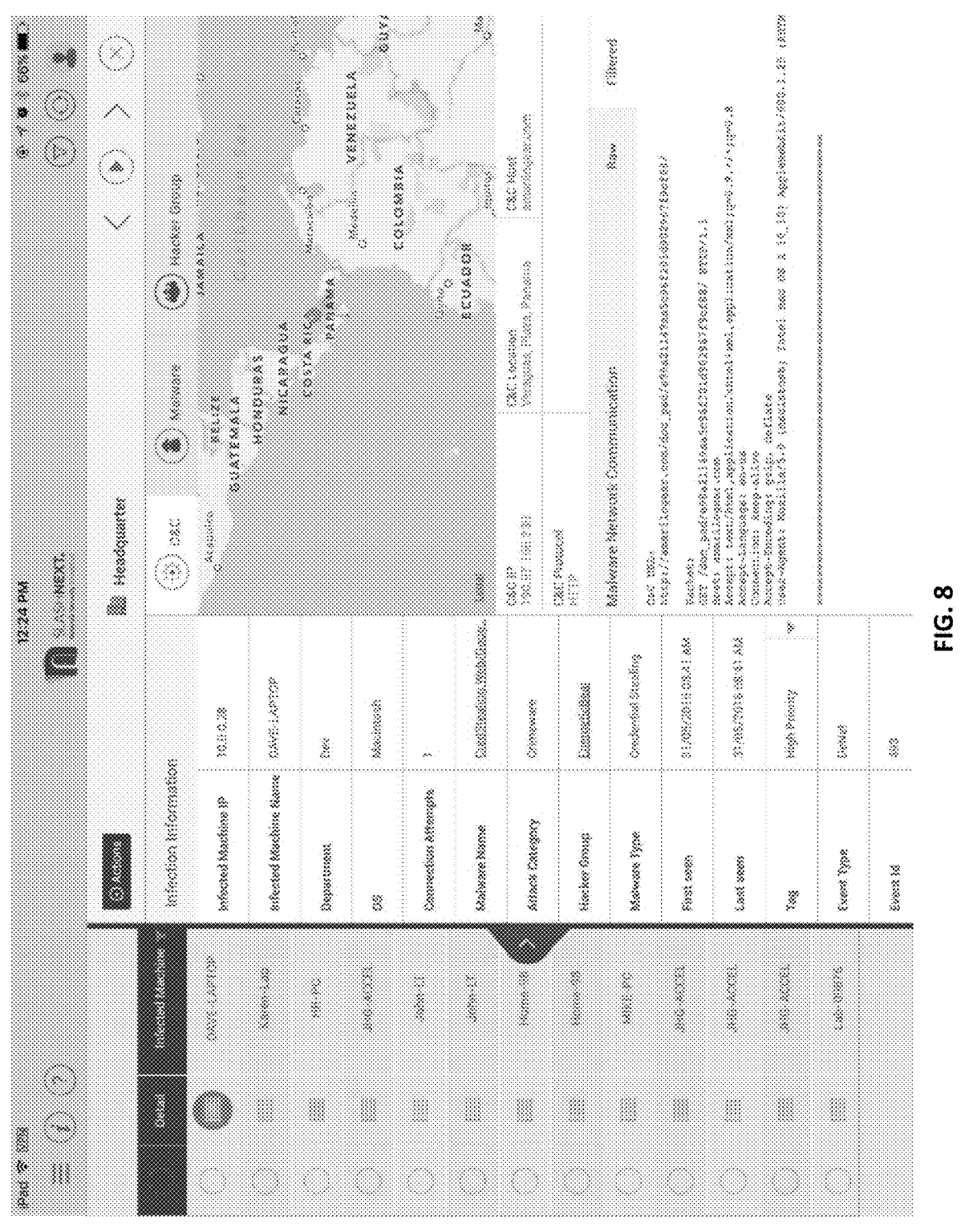
Figure 9:
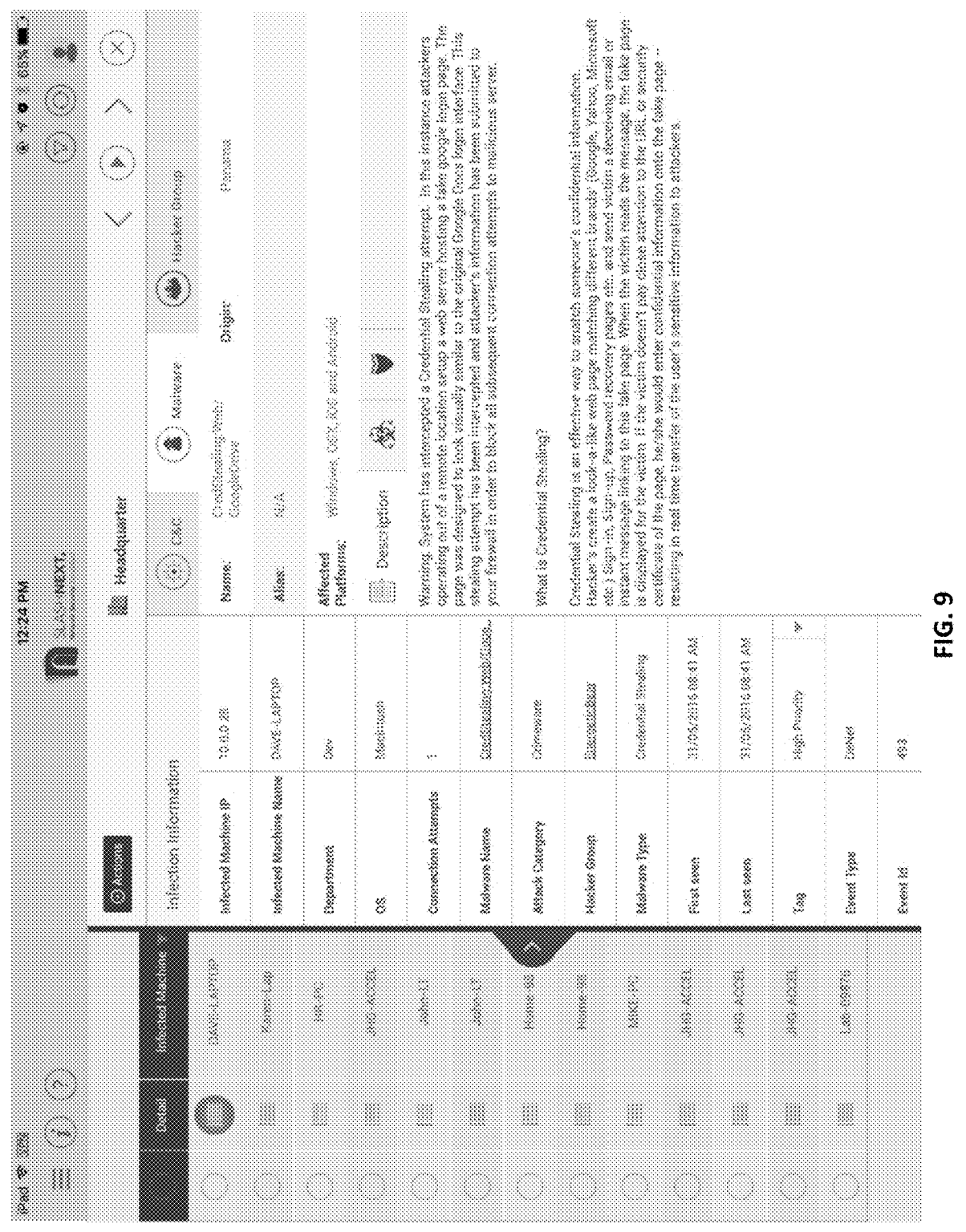
Figure 10:
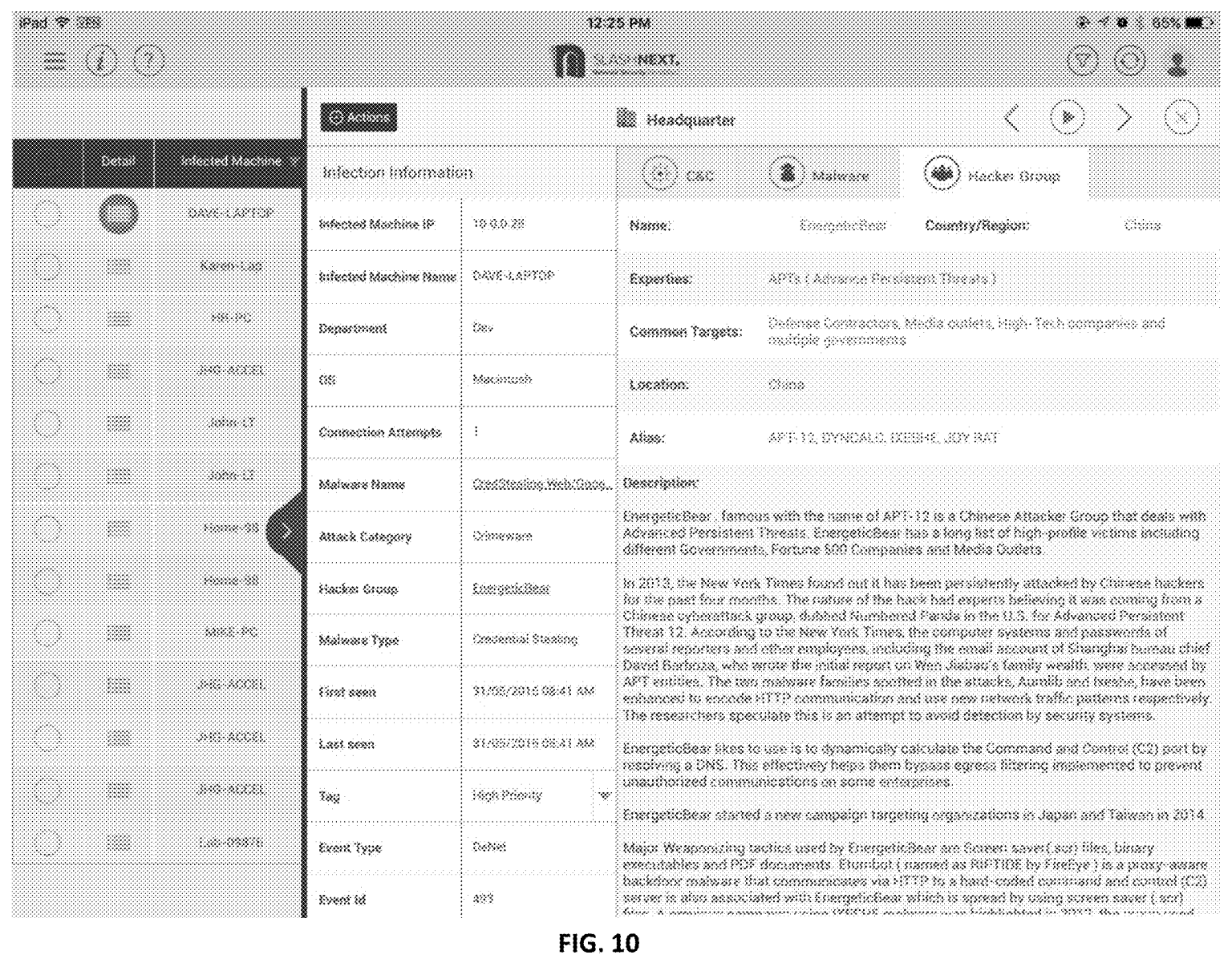

An Active Vision System user interface may comprise information shown on a dashboard regarding the identity of infected machines on the network, as well as additional details regarding the location, usage, MAC ID, or other features of the machine, including the type of the machine and the identity of the machine users. For example, FIGS. 8-10 show screen captures of a dashboard viewed via an interface of an exemplary embodiment that includes infection information regarding the identity of infected machines on the network as well as the other information described above. Additional information provided on various pages or views of the dashboard may include the IP address of the infected machine (e.g. 10.0.0.28), the name or Identifier of the infected machine (e.g. DAVE-LAPTOP), the department that uses the machine or to which the machine was registered (e.g. Dev), and the operating system (e.g. Macintosh).

As shown in FIGS. 8-10, an Active Vision System user interface may also present a user with details regarding a credential stealing attack and/or an attacker behind a credential stealing attempt. Details regarding the attacker may including the number of connection attempts made, the name of the Malware (i.e. brand and method used by an attacker to implement a credential stealing attack) identified by the Active Vision System, the type of attack or attack category (e.g. Crimeware), the hacker group that performed the attack (e.g. Energetic Bear), the type of malware that was used (e.g. credential stealing), and the first date/time and the last date/time an attack was detected or registered.

An Active Vision System user interface may further include reference information or labels that may be of used for internal reference to the event or prioritization of events. Examples may include a tag indicating the priority level of the attack (e.g. High Priority), the event type (e.g. DeNet), and an event identification or ID (e.g. 493) that may be used to refer to the particular event.

A user or system administrator may log-in to the Active Vision System from a remote location or when connected to or on the physical network. Upon login and authentication, a user may be presented with screens similar to those depicted in FIGS. 8-10. In some instances, a system administrator may wish to review all the machines that have been infected, without looking at the specifics for the given machine. To accomplish this, the system administrator may select an icon, for example the arrow on the left-hand side of the screen, which may display a full screen mode where the user may be able to view details for infected machines on the network. In other instances or after viewing all the infected machines on a network, a system administrator may select one or more infected systems to investigate the nature or details regarding a specific machine specific attack, specific incident, a compiled set of attacks performed by a particular group, the attacks on a particular day or time, and/or attacks that have occurred from a particular location or region.

A system administrator may select an infected machine for example Home-98 as selected in FIGS. 8-10, and view details regarding the attack. Details regarding Home-98 are shown under the infection information, where the IP, Machine Name, Department, and Operating System details are presented. Also presented are the number of connection attempts, the malware name, attack category, hacker group, malware type, date and time the attackers were first seen and then last seen, as well as tags including the priority, event type, and a unique number that corresponds to the specific event. On the far-right side of the dashboard display, additional details regarding the attack may be presented to the user or system administrator through a user selection of one or more tabs to access different pages or views of the dashboard. These pages may be used to display content specific to the attack or the attackers on a particular infected machine. For example, the pages may present information regarding the Command and Control center from where the attack originated, the Malware that was used, and the Hackers that performed the attack.

In the example presented in FIGS. 8-10, an Active Vision System interface comprises expandable or selectable tabs to access pages or views that display information such as the machine names for infected machines on the network, and/or details regarding an attack or set of attacks, by a particular hacker group, on a particular infected machine. Partial view of the identities and details of other infected machines on the network may be greyed out and displayed on one side of a screen, e.g. the left side of the screen. A dark grey bar may be used to separate network display (e.g. information regarding the machines on the network) from details pertaining to a specific infected machine on the network. This dark grey bar may comprise a tab with an arrow pointed towards the right side of the screen, and this tab may be used to enter a full screen view of the infected machines on the network.

FIGS. 8-10 depict screen captures of exemplary pages or views for a selected infected machine, in this case a machine referred to as Home-98. In these examples, the identities and details for infected machines on the network are depicted vertically in a shortened greyed screen on the left-hand side of the screen. Detailed content regarding the infected machine, in this case Home-98, and details regarding the attack on the infected machine are displayed on the middle and right-hand side of the screen. In this example, a user can learn more about the attackers that targeted Home-98 by selecting one of three tabs in the upper right-hand corner of the screen to access different pages or views of the dashboard (e.g. C&C, Malware, and Hacker Group).

In FIG. 8, the Command and Control (C&C) tab or page has been selected and the user interface provides details regarding the Command and Control center of the attackers that targeted Home-98. The C&C tab may be identified using the C&C IP address, the C&C Location, the C&C Host and the C&C protocol. Displayed above this information is a map, with a pin showing the location of the C&C; in this example the location is Veraguas, Plaza, Panama. The host page of the C&C, the IP address, the C&C Protocol, as well as the Malware Network Communication are also displayed.

In FIG. 9 the user or system administrator has selected the Malware tab. The greyed-out network display listing and the details specific to Home-98 remain visible on the left side of the screen; however, the right side of the screen now displays details regarding the Malware. In this instance, the full name of the Malware is identified (e.g. CredStealing: Web/GoogleDrive) and the geographic country of origin of the malware, the alias, and the affected platforms are listed. Below the affected platform on the Malware page display are another three tabs for displaying the description, the virulence, and the safety protocols or approaches. In this instance, the description is displayed, providing the user or system administrator with a detailed explanation of the type of attack that has occurred and the potential impact of the attack. This information may allow the user or system administrator to decide on additional courses of action, to raise awareness of organization or individual specific targets or attack, and/or to better inform users so they may anticipate any potential or resulting risks they may encounter later on as a result of the attack.

In FIG. 10, the user or system administrator has selected the Hacker Group tab. As in FIG. 8 and FIG. 9, the greyed-out network display listing the details specific to selected infected computer, Home-98, remain displayed on the left side of the screen; however, the right side of the screen has changed to display details regarding the Hacker Group identified by the Active Vision System as performing the credential stealing attack. Using the Hacker Group page or view, the user or system administrator may access information regarding the group that attempted a credential stealing attack. In this case, the name of the hacker group (e.g. Energetic Bear) and the location of the Hacker Group (e.g. China) are presented. Also listed is the expertise, which in this case indicates that the Hacker Group is part of the APTs (Advance Persistent Threats) group. Additional information includes the Common Targets of the group (e.g. Defense Contractors, Media outlets, High-Tech companies and multiple governments), the Location of the Hacker Group (e.g. China), Aliases (e.g. APT-12, DYNCALC, IXESHE, JOY RAT), and a description of the attacker group with various information including for example details regarding the group's history, motives, previous targets, origin etc.

In addition to the pages outlined, depicted and described in the examples above, an interface for presenting information from, or interacting with, the Active Vision System may further comprise buttons or icons for accessing the identity and access management system and/or profile of the user or system administrator, as well as icons or buttons for closing screens, flipping between screens and refreshing the screens, logs or databases listing the infected machines and details regarding the infected machines.

As described above, a candidate webpage may be loaded into a browser memory for further examination. Extracting these artifacts from the browser memory instead of fetching it directly from the web server may avoid opportunities for encryption, obfuscation and encoding. For example, an invisible browser window may be launched and subsequently, the URL of the candidate page may be opened inside the browser and the brand page may be loaded, rendered, and stored in the browser memory. In some cases, an online server is trying to perform different types of evasion techniques to avoid detection. For example, hackers may employ a variety of evasion techniques in order to evade detection from law enforcement and other investigators and to thwart attempts at spying on their malicious activities. Many malicious hosts log and monitor all connections to their servers, and can block or reset a connection once they realize that someone is trying to investigate or spy on them. Thus, in order to hide its identity from a potential malicious server, a system provided herein may use a process of connecting to the selected remote server covertly in order to collect a variety of forensics. For example, the system may use anonymous servers (e.g., virtual private network (VPN) or Proxy servers) to establish out-of-band connections it requires in order to covertly collect various types of forensic intelligence related to the selected server. Using anonymous VPN/Proxy servers to connect to potential malicious servers makes it difficult for the malicious server to trace and to block the interaction process. Depending on the type of forensic data or intelligence, the system can also initiate multiple connections to a server through one or more VPN/Proxy gateways. The provided system may mimic or pose as a normal client to interact with the candidate webpage. Forensics intelligence may be collected during the interaction and then be analyzed to determine the candidate webpage as benign or malicious.

In some cases, the system may load the candidate webpage to a virtual browser memory, interact with the candidate webpage and collect the forensics intelligence on the candidate webpage behavior. As described above, a malicious sever may perform different types of evasion techniques to avoid detection. For example, a malicious server may present a variety of challenge-response type of tests such as image challenge, text challenge, audio challenge, or random popups/dialogues on the screen before showing the actual content or actual phishing page. The system may interact with the probed server by responding to the challenge-response tests with aid of virtual keyboard and/or virtual mouse. For example, the system may interact with the browser through keyboard and mouse simulation APIs. Browsers usually offer Web Drivers that allow interaction with browser software through APIs to simulate keyboard input and mouse movement. Using keyboard and mouse simulation APIs, a browser can accept input as if it's coming from a hardware-based keyboard or mouse.

Figure 12:
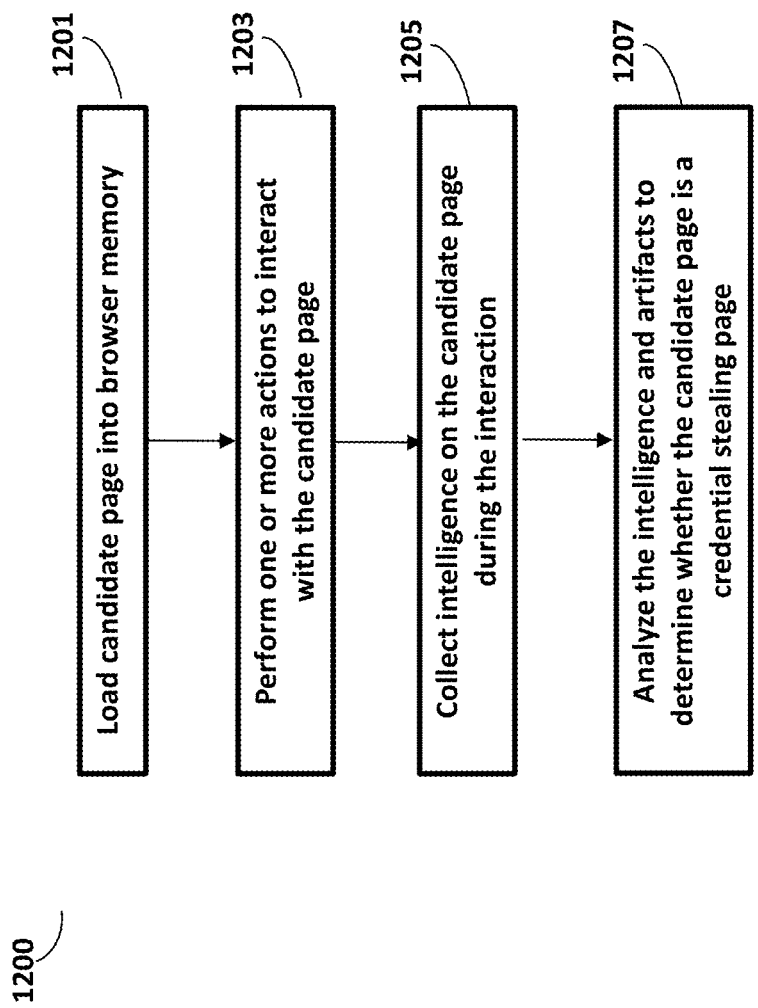
FIG. 12 a flowchart showing an exemplary method for detecting brand-based credential stealing attacks with proactive probing.

FIG. 12 a flowchart showing an exemplary method 1200 for detecting brand-based credential stealing attacks with proactive probing. In some embodiments, the method 1200 may begin with loading a candidate page into a browser memory (operation 1201). In some cases, after a candidate page is loaded to a browser memory, key artifacts may be extracted. Such key artifacts along with intelligence collected during a proactive interaction with the candidate webpage may be used to determine a credential stealing web page. Concurrent with extracting the key artifacts, one or more actions may be performed to interact with the candidate page (operation 1203). For example, the candidate may present a variety of challenge-response type of tests such as image challenge, text challenge, audio challenge, or random popups/dialogues on the screen. The system may interact with the candidate page by performing one or more actions in response to the challenge-response tests. For instance, the one or more actions may include, but not limited to, dismissing random popups/dialogues, responding to an image challenge, text challenge, audio challenge, entering dummy credential or selecting a user account or other actions. Such one or more actions may be performed with aid of a virtual mouse or a virtual keyboard of the system.

Forensics intelligence on the candidate webpage behavior may be collected during the interaction (operation 1205). For example, a credential stealing page may accept dummy credentials since it does not have the correct credential. In another example, after the system responding to the challenge test, the candidate webpage may expose the actual phishing page.

The intelligence collected during the interaction along with data extracted from the artifacts may be analyzed and used to determine whether the candidate page is a credential stealing page (operation 1207). In some cases, the intelligence and the artifacts may be supplied to a machine learning trained model as input data and the output may indicate whether the candidate page is a credential stealing page. In some cases, the artifacts or the intelligence data may be pre-processed before being processed by the machine learning trained model. The artifacts can be analyzed using the methods as described elsewhere herein (e.g., FIG. 3, FIG. 4, FIG. 5). For example, similar features from artifacts extracted from the candidate page may be extracted from artifacts of profiles stored in the Brand Knowledge Base, and a comparison may be made with features from a selected record associated with a brand page (e.g. a brand profile) retrieved from the Brand Knowledge Base and the features extracted from the candidate page. A similarity feature set may be extracted and generated from the candidate page and the selected record stored within the Brand Knowledge Base. These feature sets may be used to classify the candidate page relative to each of the records stored in the Brand Knowledge Base and determine whether there is a match.

In some cases, the system may use anonymous communications channels such as VPN/Proxy to interact with the candidate page in order to hide its true identity and avoid getting blacklisted. The selection of the proxies and VPN can be made based on historical data or a machine learning trained model. For instance, among all the available distant geo regions, the region with the highest law enforcement power can be selected. Other suitable techniques such as image recognition, semantic analysis, parsing HTM, URL, cookie data, and the like may be used to perform automated interaction with the candidate webpage/server.

Figure 13:
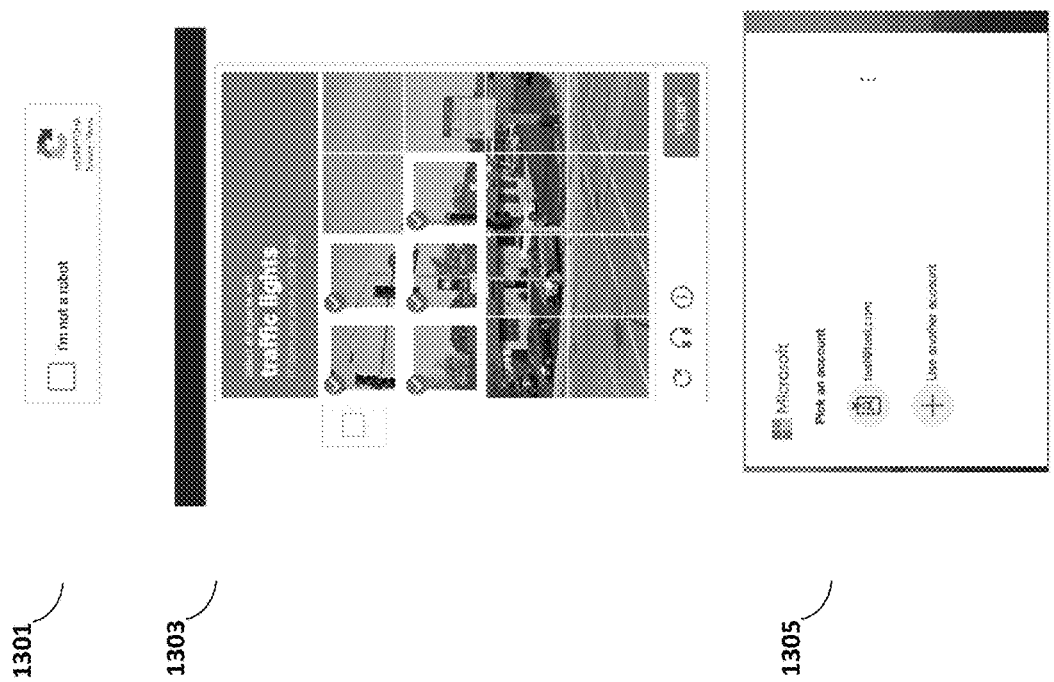
FIG. 13 shows examples of tests presented in the virtual browser by a candidate webpage.
Figure 14:
FIG. 14 shows an example of interacting with the webpage with aid of virtual keyboard and mouse.

FIGS. 13-17 show examples of interactions with a probed server after loading a candidate webpage into a virtual browser memory. FIG. 13 shows examples of tests presented in the virtual browser by a candidate webpage. For instance, the candidate webpage may present reCAPTCHA checkbox widget 1301 or a reCAPTCHA image selection test 1303 for filtering bots. The system may bypass the tests with aid of a virtual mouse that mimics the selection and movement of the mouse. In some cases, the system may dynamically disable the piece of web code responsible for rendering captcha on the screen to skip the captcha stage. The candidate webpage may present a login page prompting a user to select of an account 1305. The system may select an account with aid of a virtual keyboard or a virtual mouse. In some cases, after the system responding to the challenge test, the candidate webpage may expose the actual phishing page. FIG. 14 shows an example of interacting with the webpage with aid of virtual keyboard. In some cases, the candidate webpage may prompt a user to enter inputs for passing a challenge test and the system may respond to the tests with aid of a virtual keyboard.

Figure 15:
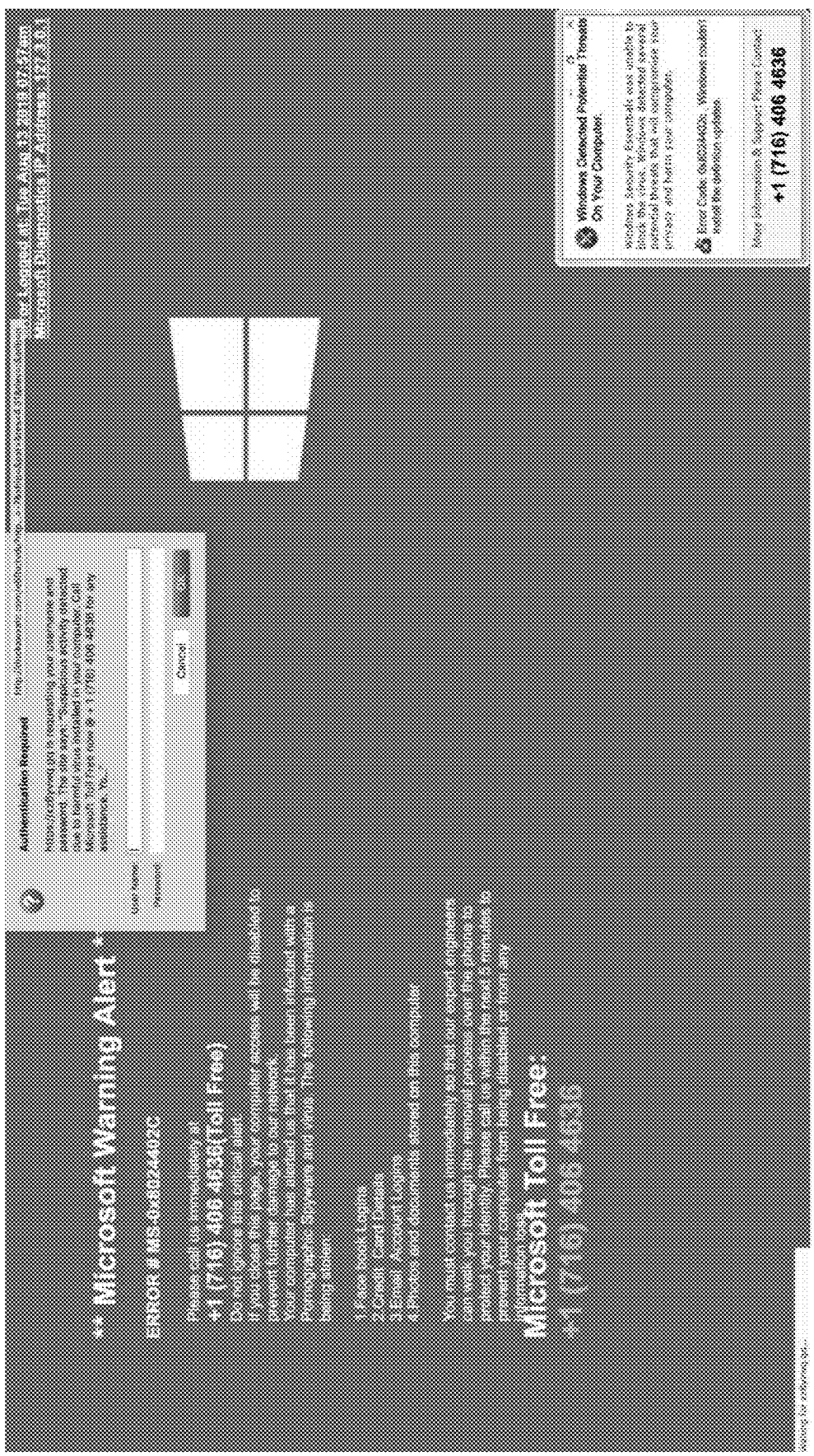
FIG. 15 shows an example of interacting with a candidate webpage that presents random popups/dialogues on the screen.

FIG. 15 shows an example of interacting with a candidate webpage that presents random popups/dialogues on the screen. The system may recognize the popups and dismiss them (e.g., close the popup window) with virtual keyboard and/or virtual mouse to mimic the behavior of a real user and reveal the phishing page hidden in the background.

Figure 16:
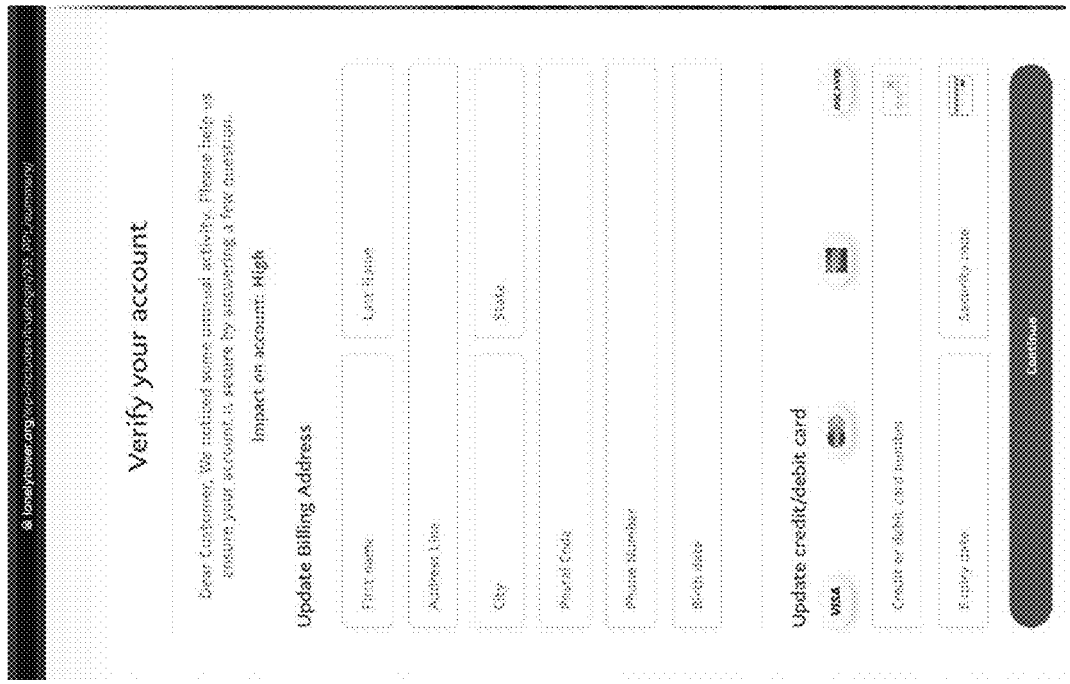
FIG. 16 shows examples of various interactions with a candidate webpage prompting users to enter credentials.

FIG. 16 shows examples of various interactions with a candidate webpage prompting users to enter credentials. In some cases, a credential stealing page may prompt a user to enter credentials. The system may enter a dummy credential with aid of a virtual keyboard and/or virtual mouse. The dummy credential may be created by the system without revealing the actual credential of the user. The credential stealing page usually accepts dummy credentials since it does not have the correct credential. Such behavior may be collected and analyzed by the system for determining a credential stealing webpage.

Figure 17:
FIG. 17 shows various examples of interacting with a candidate webpage performing evasion techniques.

FIG. 17 shows various examples of interacting with a candidate webpage performing evasion techniques. For example, a malicious server may present interactive buttons, widgets, icons, functions and the like before leading to the actual phishing page. The system may enter the requested information (e.g., dummy information), click the button or icons (e.g., 'I agree', 'download', 'sign in', 'view folder') with aid of the virtual mouse and/or virtual keyboard.

The aforementioned interactions may be performed in a virtual browser which is invisible to a user. Such interactions performed by system may bypass the evasion operations such that the system may access the actual malicious content or malicious webpage. In some cases, the behaviors of the candidate webpage during the interaction may be collected and analyzed by the machine-learning-based page examination engine to determine whether the webpage being investigated is benign or malicious. For instance, if a candidate webpage accepts one or more dummy credentials, the candidate webpage may be determined to be a credential stealing page. In some cases, malicious content (e.g., malicious web sites) may be exposed after the system bypass the evasion operations and such content may be analyzed by the machine-learning-based page examination engine to determine whether the webpage being investigated is benign or malicious. For instance, contents such as HTML, code, images, java script, and/or rendered text loaded into the virtual browser memory may be analyzed by a trained classifier to determine whether the contents are malicious or benign. The process of determining malicious content can be the same as the methods as described elsewhere herein.

Computer Control Systems

Figure 11:
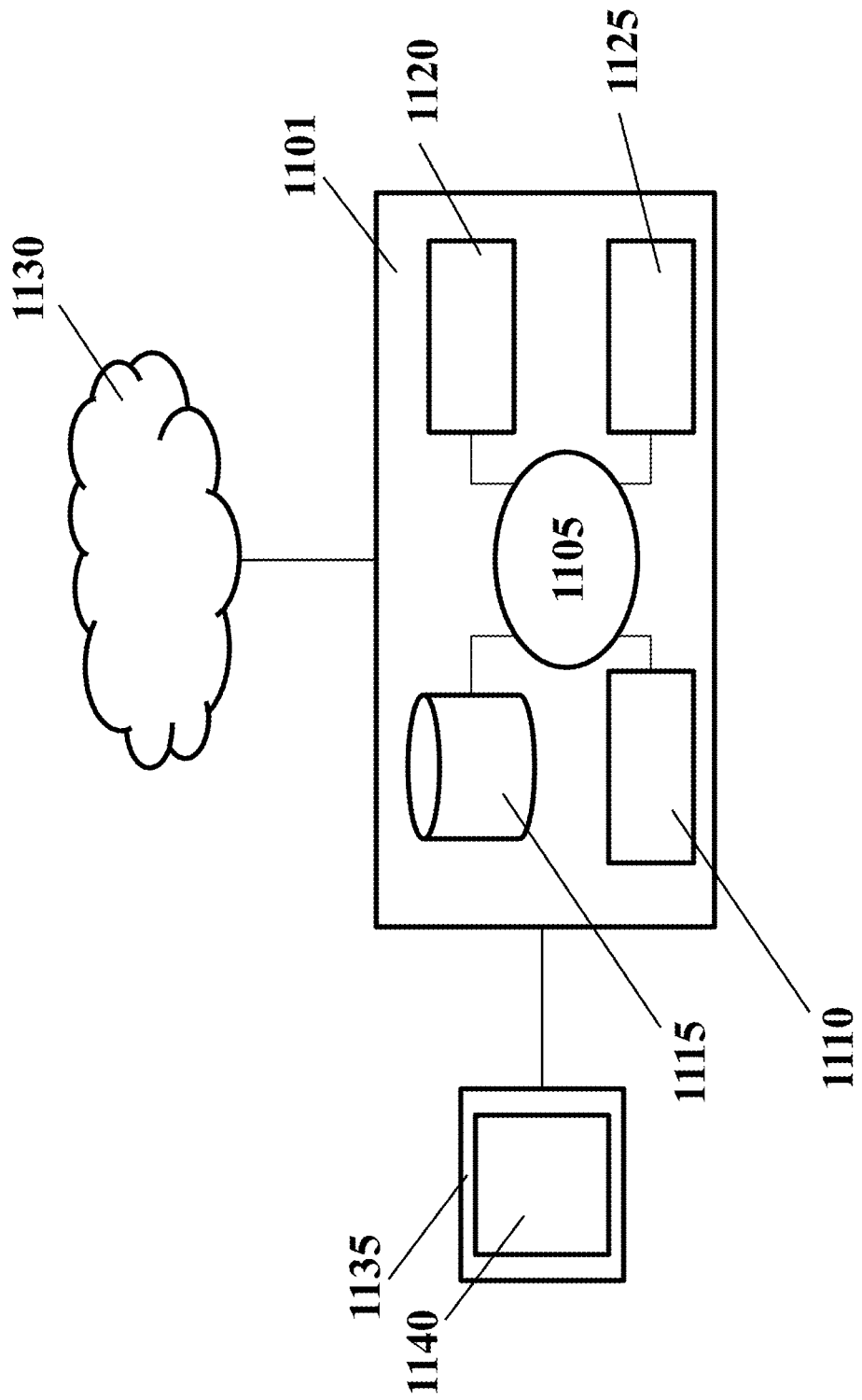
FIG. 11 shows a computer control system that is programmed or otherwise configured to implement methods provided herein.

The present disclosure provides computer control systems that are programmed to implement methods of the disclosure. FIG. 11 shows a computer system 1101 that is programmed or otherwise configured to detect credential stealing attacks. The computer system 1101 can identify various aspects of credential stealing websites and identify them as shown in the present disclosure, such as, for example, credential stealing attacks that are directed to a user when they access a particular website. The computer system 1101 subjected to an attack can be an electronic device of a user or a computer system that is remotely located with respect to the electronic device. The electronic device can be a mobile electronic device.

The computer system 1101 includes a central processing unit (CPU, also "processor" and "computer processor" herein) 1105, which can be a single core or multi core processor, or a plurality of processors for parallel processing. The processor may be a graphic processing unit (GPU), a single core or multi core processor, a plurality of processors for parallel processing, in the form of fine-grained spatial architectures such as a field programmable gate array (FPGA), an application-specific integrated circuit (ASIC), and/or one or more Advanced RISC Machine (ARM) processors. The processor can be any suitable integrated circuits, such as computing platforms or microprocessors, logic devices and the like. Although the disclosure is described with reference to a processor, other types of integrated circuits and logic devices are also applicable. The processors or machines may not be limited by the data operation capabilities. The processors or machines may perform 512 bit, 256 bit, 128 bit, 64 bit, 32 bit, or 16 bit data operations.

The computer system 1101 also includes memory or memory location 1110 (e.g., random-access memory, read-only memory, flash memory), electronic storage unit 1115 (e.g., hard disk), communication interface 1120 (e.g., network adapter) for communicating with one or more other systems, and peripheral devices 1125, such as cache, other memory, data storage and/or electronic display adapters. The memory 1110, storage unit 1115, interface 1120 and peripheral devices 1125 are in communication with the CPU 1105 through a communication bus (solid lines), such as a motherboard. The storage unit 1115 can be a data storage unit (or data repository) for storing data. The computer system 1101 can be operatively coupled to a computer network ("network") 1130 with the aid of the communication interface 1120. The network 1130 can be the Internet, an internet and/or extranet, or an intranet and/or extranet that is in communication with the Internet. The network 1130 in some cases is a telecommunication and/or data network. The network 1130 can include one or more computer servers, which can enable distributed computing, such as cloud computing. The network 1130, in some cases with the aid of the computer system 1101, can implement a peer-to-peer network, which may enable devices coupled to the computer system 1101 to behave as a client or a server.

The CPU 1105 can execute a sequence of machine-readable instructions, which can be embodied in a program or software. The instructions may be stored in a memory location, such as the memory 1110. The instructions can be directed to the CPU 1105, which can subsequently program or otherwise configure the CPU 1105 to implement methods of the present disclosure. Examples of operations performed by the CPU 1105 can include fetch, decode, execute, and writeback.

The CPU 1105 can be part of a circuit, such as an integrated circuit. One or more other components of the system 1101 can be included in the circuit. In some cases, the circuit is an application specific integrated circuit (ASIC).

The storage unit 1115 can store files, such as drivers, libraries and saved programs. The storage unit 1115 can store user data, e.g., user preferences and user programs. The computer system 1101 in some cases can include one or more additional data storage units that are external to the computer system 1101, such as located on a remote server that is in communication with the computer system 1101 through an intranet or the Internet.

The computer system 1101 can communicate with one or more remote computer systems through the network 1130. For instance, the computer system 1101 can communicate with a remote computer system of a user, allowing the computer system to monitor one or more infected machines on the network. Examples of remote computer systems that may be infected and monitored by the computer system, or used to monitor infected machines sharing a network with the computer system, include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1101 via the network 1130.

Methods as described herein can be implemented by way of machine (e.g., computer processor) executable code stored on an electronic storage location of the computer system 1101, such as, for example, on the memory 1110 or electronic storage unit 1115. The machine executable or machine-readable code can be provided in the form of software. During use, the code can be executed by the processor 1105. In some cases, the code can be retrieved from the storage unit 1115 and stored on the memory 1110 for ready access by the processor 1105. In some situations, the electronic storage unit 1115 can be precluded, and machine-executable instructions are stored on memory 1110.

The code can be pre-compiled and configured for use with a machine having a processor adapted to execute the code or can be compiled during runtime. The code can be supplied in a programming language that can be selected to enable the code to execute in a pre-compiled or as-compiled fashion.

Aspects of the systems and methods provided herein, such as the computer system 1101, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming.

All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1101 can include or be in communication with an electronic display 1135 that comprises a user interface (UI) 1140 for providing, for example, the interfaces depicted in FIG. 8, FIG. 9, and FIG. 10. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1105. The algorithm can, for example, perform binary classification of candidate pages to determine if they are credential stealing pages or are NOT credential stealing pages. A binary classification model may be constructed after collecting artifacts derived from known credential stealing pages and using the artifacts to identify a feature set that may be used to train a statistical model and establish appropriate thresholding parameters.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for detecting a credential stealing attack comprising:
   (a) using a page rendering module to i) launch an invisible browser window to load and render a candidate web page into a browser memory by opening an URL of the candidate web page inside the invisible browser window, and ii) extract an artifact from the candidate web page rendered and stored in the browser memory, wherein the artifact comprises image and source code extracted from the browser memory;
   (b) extracting, by a custom credential stealing feature extractor, different types of features (i) from the artifact of the candidate web page and (ii) from a known custom credential stealing page to generate a custom similarity feature set;

(c) processing the custom similarity feature set using a machine learning algorithm trained classifier to determine whether the candidate page matches the known custom credential stealing page; and (d) providing a graphical interface for displaying information regarding the candidate web page, the information comprising: (i) an identity of an infected machine on a network that has accessed the candidate web page if the candidate page matches the known custom credential stealing page and (ii) a feature of the infected machine, wherein the feature is selected from the group consisting of a machine location, a machine usage, a MAC ID, a type of machine, a machine operating system, and an identity of a machine user.

2. The method of claim 1, wherein the custom similarity feature set comprises visual similarity features and source code similarity feature.

3. The method of claim 1, wherein the artifact further comprises written text from the candidate web page.

4. The method of claim 3, wherein the custom similarity feature set comprises visual similarity features, natural language similarity features, and source code similarity feature.

5. The method of claim 2, wherein the custom similarity feature set further comprises a brand logo similarity feature set.

6. The method of claim 5, wherein the brand logo similarity feature set is generated based on a comparison of the different types of features extracted from the candidate web page and brand logo features extracted from one or more brand logo profiles stored in a brand logo knowledge base.

7. The method of claim 1, wherein the known custom credential stealing page is retrieved from a custom credential stealing web sites knowledge base.

8. The method of claim 7, further comprising, upon determining the candidate page matches the known custom credential stealing page, storing the candidate page to the custom credential stealing web sites knowledge base.

9. The method of claim 7, further comprising, upon determining the candidate page does not match the known custom credential stealing page, retrieving another known custom credential stealing page from the custom credential stealing web sites knowledge base and repeating operations (b)-(c).

10. A system detecting a credential stealing attack comprising:

(i) a memory for storing a set of software instructions, (ii) one or more processors configured to execute the set of software instructions to implement a page examination engine, wherein the page examination engine is configured to:

(a) use a page rendering module to i) launch an invisible browser window to load and render a candidate web page into a browser memory by opening an URL of the candidate web page inside the invisible browser window, and ii) extract an artifact from the candidate web page rendered and stored in the browser memory, wherein the artifact comprises image and source code extracted from the browser memory;

(b) extract different types of features (i) from the artifact of the candidate web page and (ii) from a known custom credential stealing page to generate a custom similarity feature set; and (c) process the custom similarity feature set using a machine learning algorithm trained classifier to determine whether the candidate page matches the known custom credential stealing page; and (iii) a graphical interface for displaying information regarding the candidate web page, the information comprising: (i) an identity of an infected machine on a network that has accessed the candidate web page if the candidate page matches the known custom credential stealing page and (ii) a feature of the infected machine, wherein the feature is selected from the group consisting of a machine location, a machine usage, a MAC ID, a type of machine, a machine operating system, and an identity of a machine user.

11. The system of claim 10, wherein the custom similarity feature set comprises visual similarity features and source code similarity feature.

12. The system of claim 11, wherein the artifact further comprises written text from the candidate web page.

13. The system of claim 12, wherein the custom similarity feature set comprises visual similarity features, natural language similarity features, and source code similarity feature.

14. The system of claim 11, wherein the custom similarity feature set further comprises a brand logo similarity feature set.

15. The system of claim 14, wherein the brand logo similarity feature set is generated based on a comparison of the different types of features extracted from the candidate web page and brand logo features extracted from one or more brand logo profiles stored in a brand logo knowledge base.

16. The system of claim 10, wherein the known custom credential stealing page is retrieved from a custom credential stealing web sites knowledge base.

17. The system of claim 16, wherein the page examination engine is further configured to: upon determining the candidate page matches the known custom credential stealing page, store the candidate page to the custom credential stealing web sites knowledge base.

18. The system of claim 16, wherein the page examination engine is further configured to: upon determining the candidate page does not match the known custom credential stealing page, retrieve another known custom credential stealing page from the custom credential stealing web sites knowledge base and repeating operations (b)-(c).

* * * * *